(12) United States Patent
Kupke et al.

(10) Patent No.: US 8,001,462 B1
(45) Date of Patent: Aug. 16, 2011

(54) UPDATING SEARCH ENGINE DOCUMENT INDEX BASED ON CALCULATED AGE OF CHANGED PORTIONS IN A DOCUMENT

(75) Inventors: Joachim Kupke, San Jose, CA (US); Jeff Cox, New York, NY (US)

(73) Assignee: Google Inc., Mountain View, CA (US)

( * ) Notice: Subject to any disclaimer, the term of this patent is extended or adjusted under 35 U.S.C. 154(b) by 373 days.

(21) Appl. No.: 12/363,529

(22) Filed: Jan. 30, 2009

(51) Int. Cl.
*G06F 17/00* (2006.01)
*G06F 17/30* (2006.01)

(52) U.S. Cl. .................. 715/229; 707/707; 707/711

(58) Field of Classification Search .................. 707/709; 715/229
See application file for complete search history.

(56) References Cited

U.S. PATENT DOCUMENTS

| | | | | |
|---|---|---|---|---|
| 5,956,722 | A * | 9/1999 | Jacobson et al. ................ | 1/1 |
| 6,012,087 | A * | 1/2000 | Freivald et al. ............... | 709/218 |
| 6,349,296 | B1 * | 2/2002 | Broder et al. .................. | 1/1 |
| 6,434,573 | B1 * | 8/2002 | Jacobson et al. ................ | 1/1 |
| 6,547,829 | B1 * | 4/2003 | Meyerzon et al. ............ | 715/234 |
| 6,638,314 | B1 * | 10/2003 | Meyerzon et al. ............ | 715/234 |
| 7,366,718 | B1 * | 4/2008 | Pugh et al. ..................... | 1/1 |
| 7,627,613 | B1 * | 12/2009 | Dulitz et al. .................... | 1/1 |
| 7,644,107 | B2 * | 1/2010 | Neagovici-Negoescu et al. ............................ | 707/715 |
| 7,725,452 | B1 * | 5/2010 | Randall ......................... | 707/709 |
| 7,818,312 | B2 * | 10/2010 | Broder et al. .................. | 707/709 |
| 2002/0032772 | A1 * | 3/2002 | Olstad et al. ................... | 709/224 |
| 2003/0105744 | A1 * | 6/2003 | McKeeth ......................... | 707/3 |
| 2005/0015394 | A1 * | 1/2005 | McKeeth ....................... | 707/100 |
| 2005/0144193 | A1 * | 6/2005 | Henzinger ................ | 707/103 R |
| 2005/0262089 | A1 * | 11/2005 | Wu ................................ | 707/10 |
| 2006/0248063 | A1 * | 11/2006 | Gordon ............................ | 707/3 |
| 2006/0294052 | A1 * | 12/2006 | Kulkarni et al. ................. | 707/1 |
| 2007/0094254 | A1 * | 4/2007 | Cutts et al. ....................... | 707/5 |
| 2007/0100817 | A1 * | 5/2007 | Acharya et al. ................. | 707/5 |
| 2007/0226206 | A1 * | 9/2007 | Pavlovski et al. ............... | 707/5 |
| 2008/0104256 | A1 * | 5/2008 | Olston .......................... | 709/228 |

OTHER PUBLICATIONS

Schleimer et al., "Winnowing: Local Alogrithms for Document Fingerprinting," SIGMOD, 10 pages (2003).*

* cited by examiner

*Primary Examiner* — Doug Hutton
*Assistant Examiner* — Scott Kelly
(74) *Attorney, Agent, or Firm* — Harrity & Harrity, LLP

(57) ABSTRACT

A system receives a document that includes new content and aged content, and compares the document with a prior version of the document that includes the aged content but not the new content. The system also separates the new content and the aged content based on the comparison, determines ages associated with the new content and the aged content, and determines whether the ages of the new content and the aged content are greater than or equal to an age threshold. The system further calculates a checksum of the document based on the aged content when the age of the aged content is greater than or equal to the age threshold, and the age of the new content is less than the age threshold, and stores the calculated checksum.

25 Claims, 20 Drawing Sheets

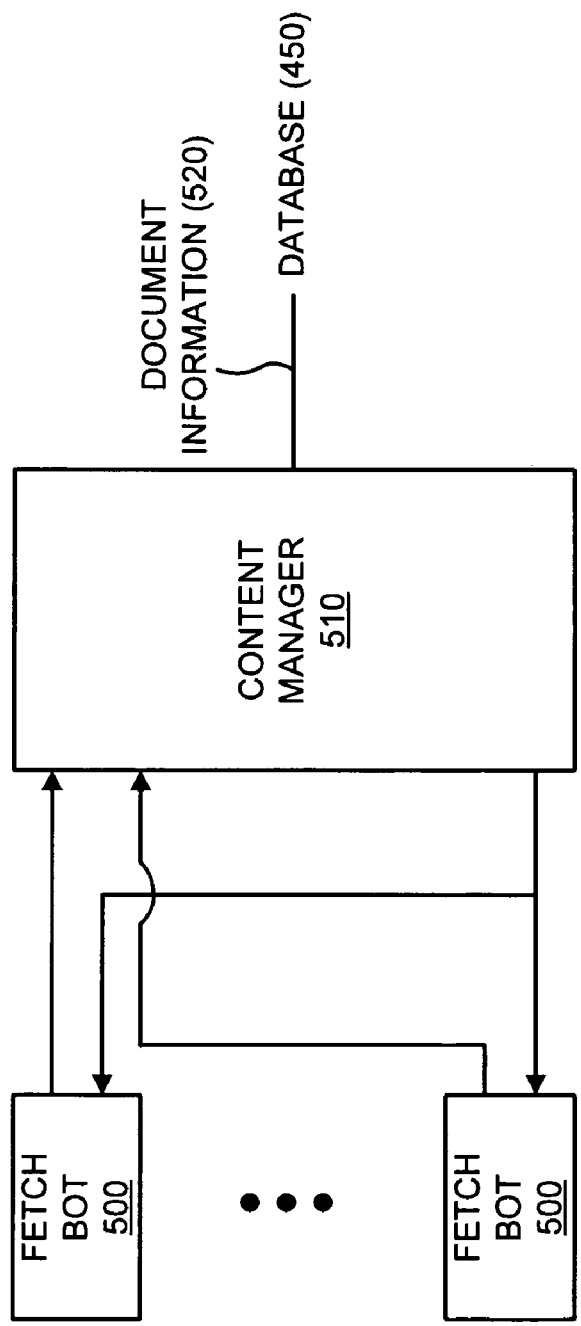

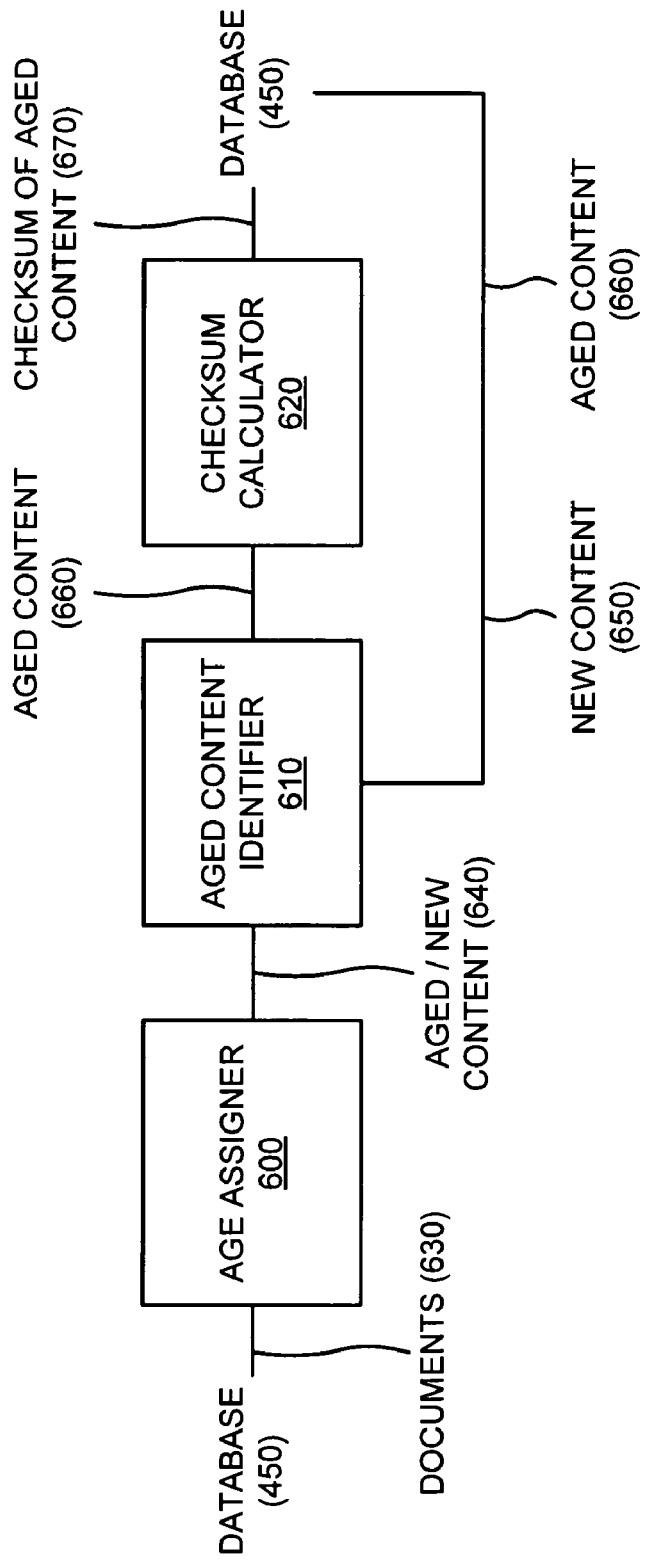

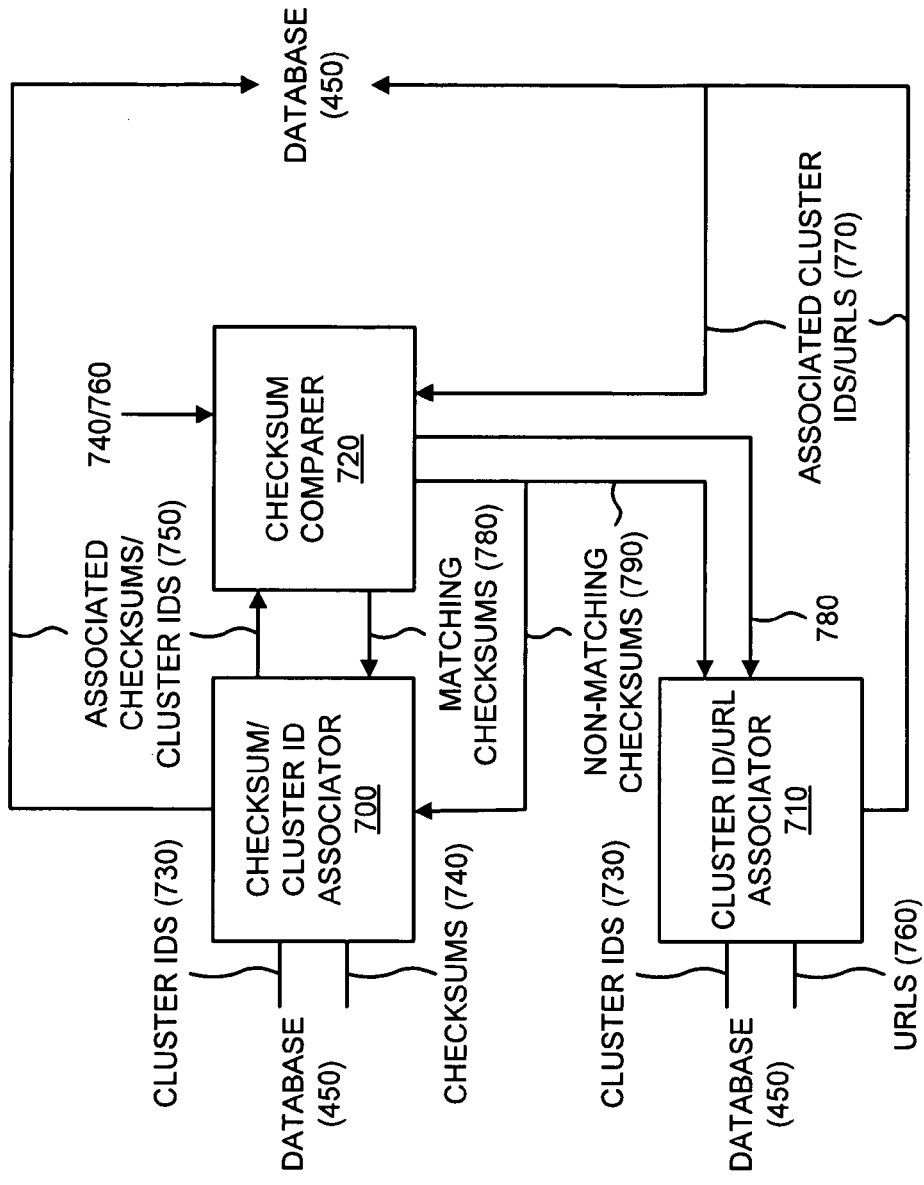

FIG. 8A

| CHECKSUM | CLUSTER ID |
|---|---|
| CHECKSUM 1 | CLUSTER ID1 |
| CHECKSUM 2 | CLUSTER ID1 |
| CHECKSUM 3 | CLUSTER ID2 |
| CHECKSUM 4 | CLUSTER ID2 |

FIG. 8B

| CLUSTER ID 860 | ADDRESS 870 |
|---|---|
| CLUSTER ID1 | "A.COM" |
| CLUSTER ID1 | "B.COM" |
| CLUSTER ID2 | "C.COM" |
| CLUSTER ID2 | "D.COM" |

880, 890

850

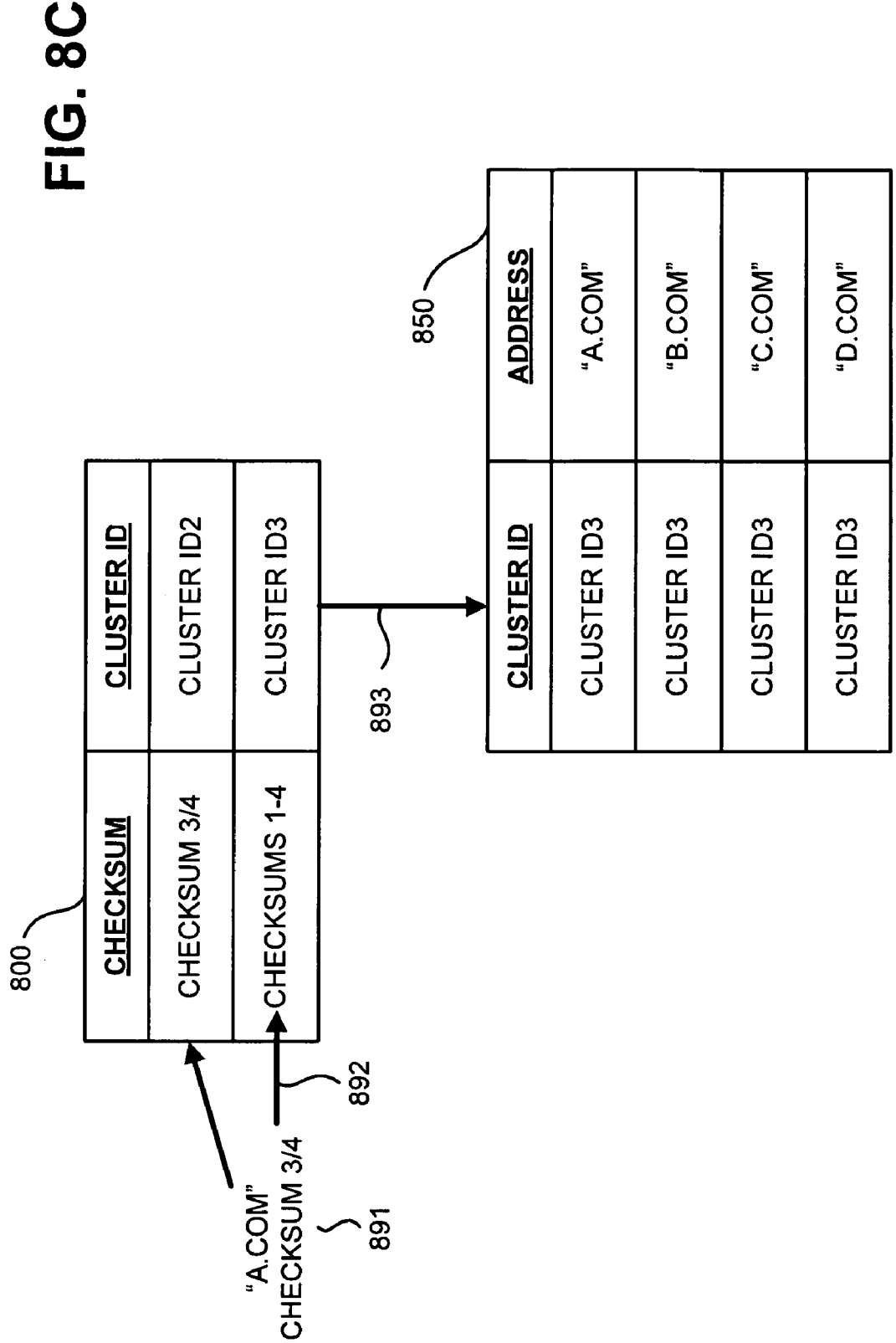

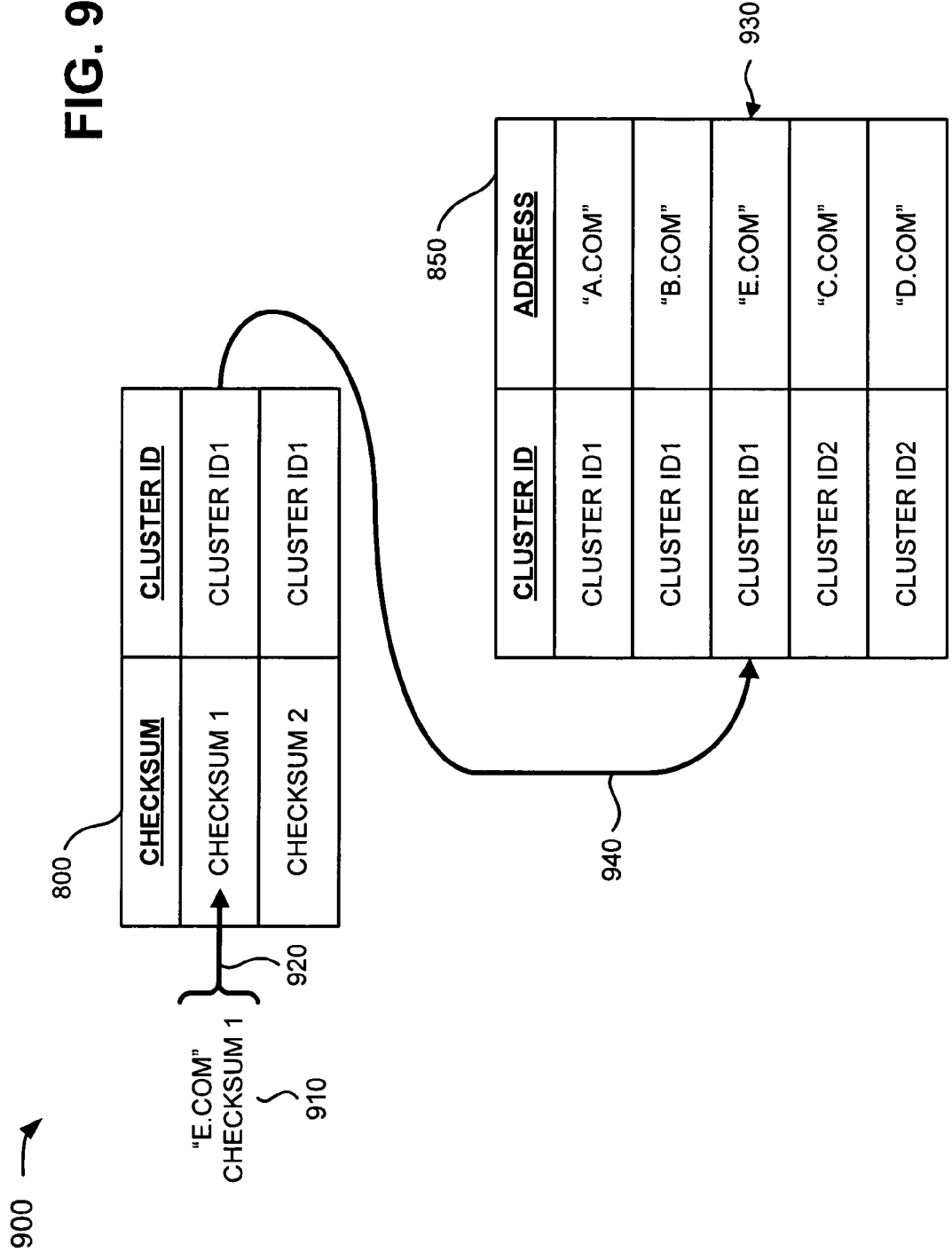

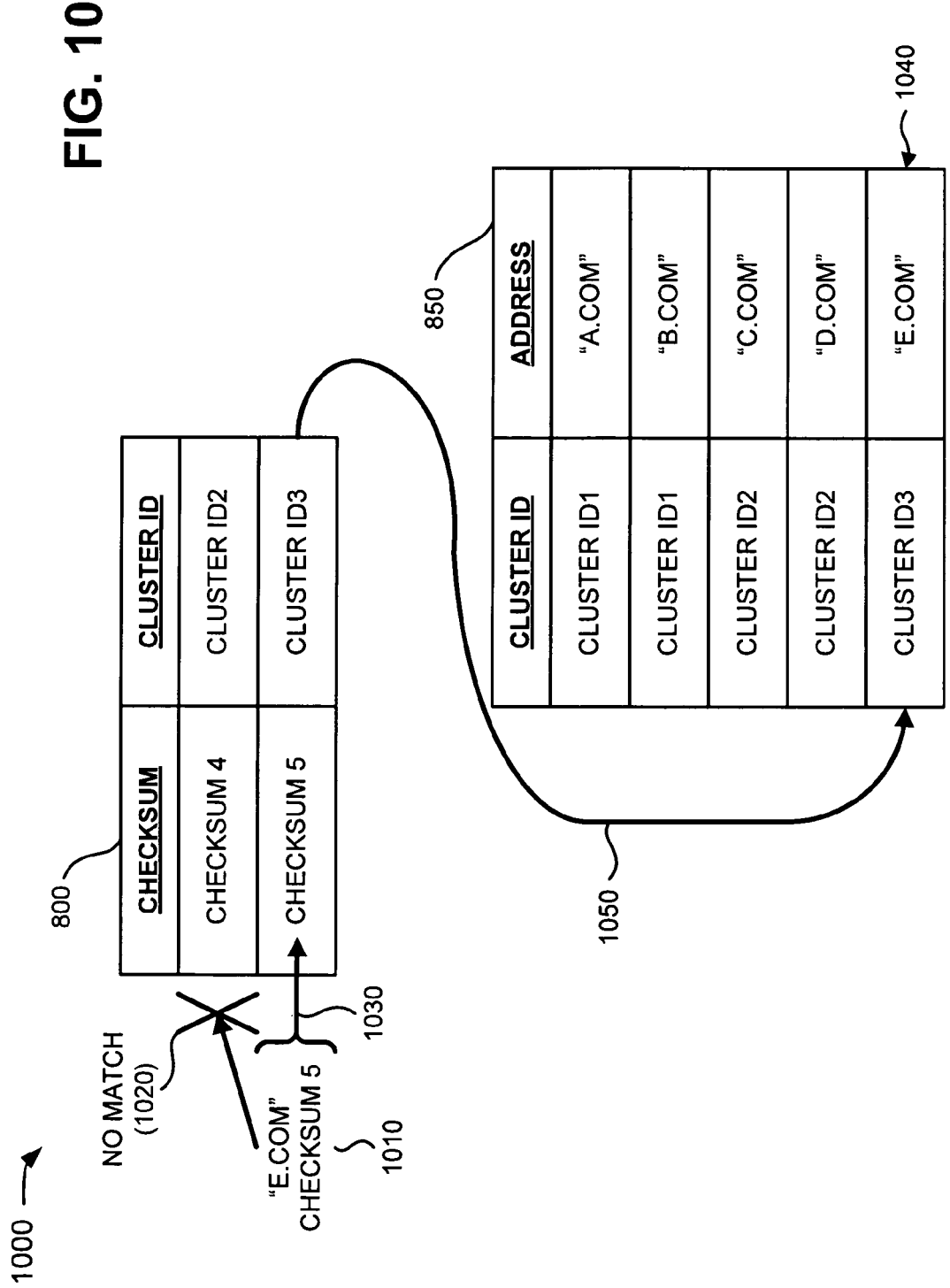

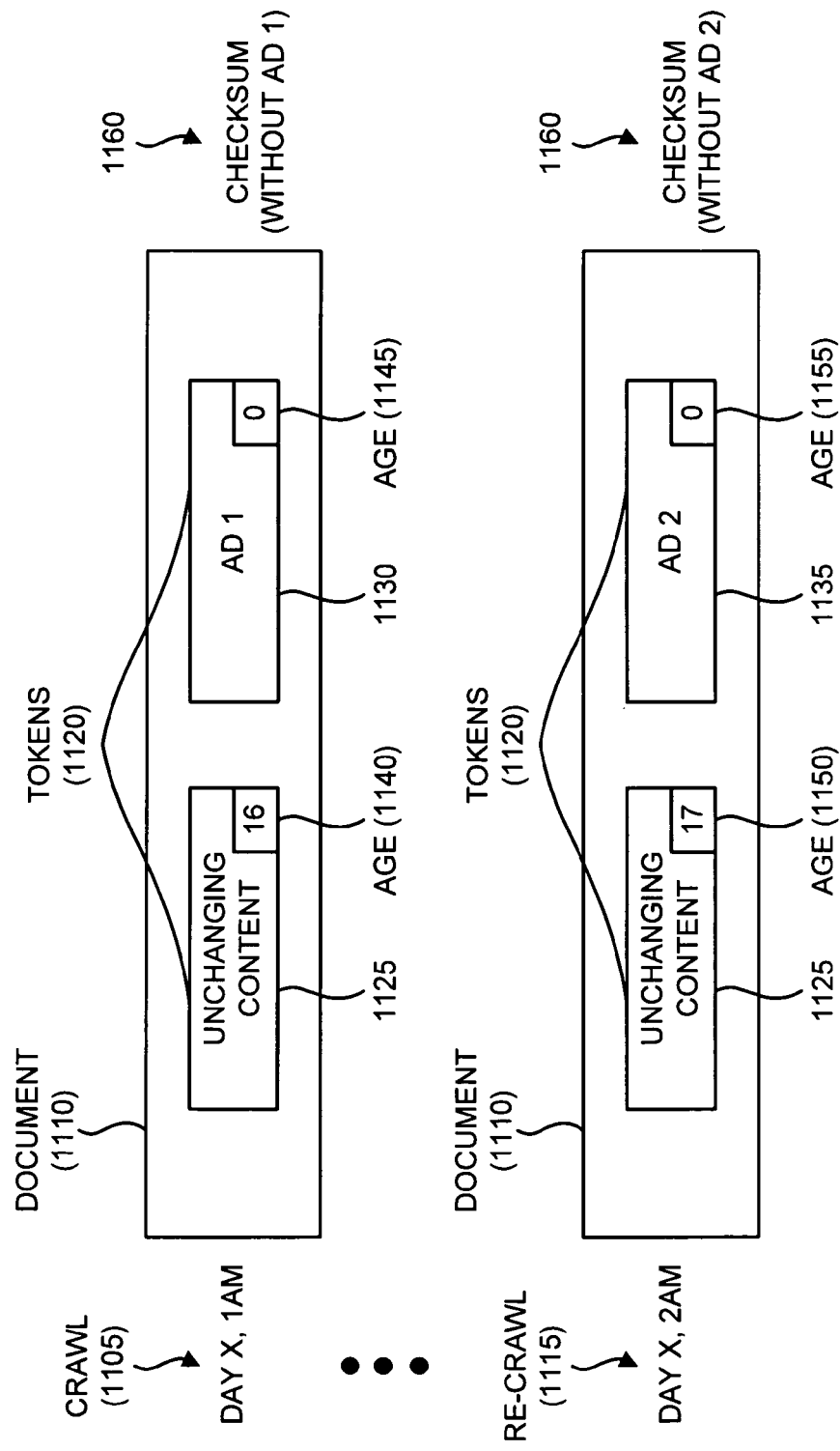

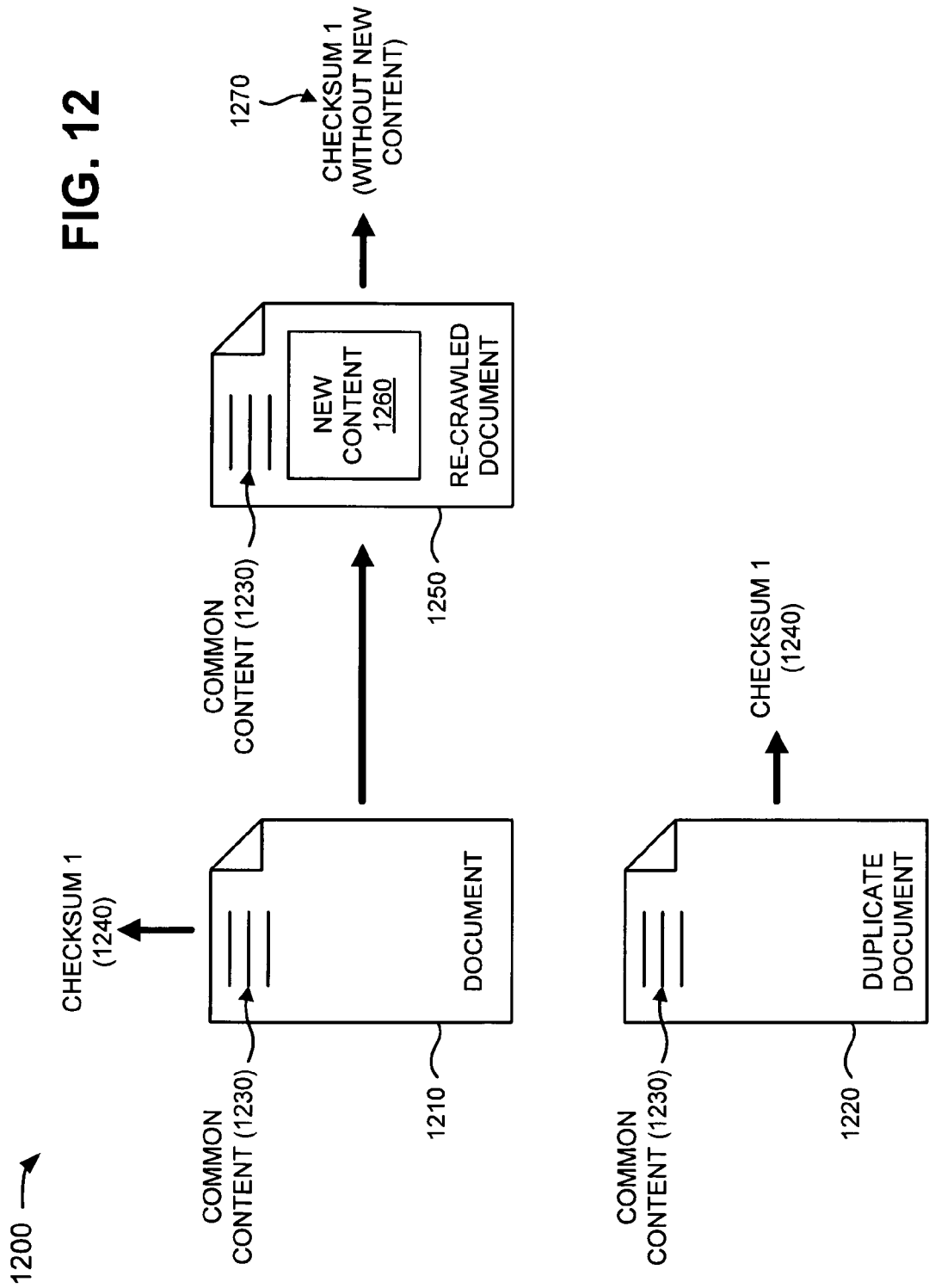

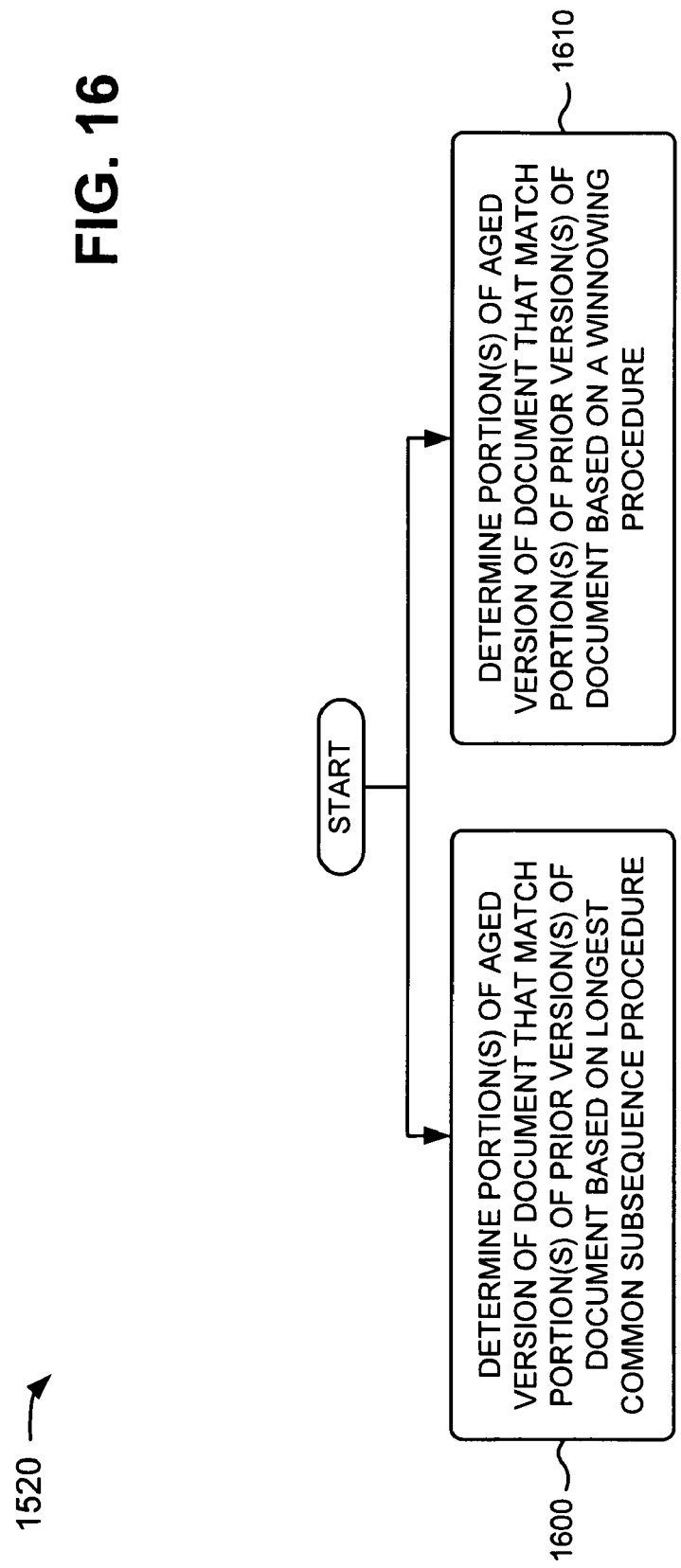

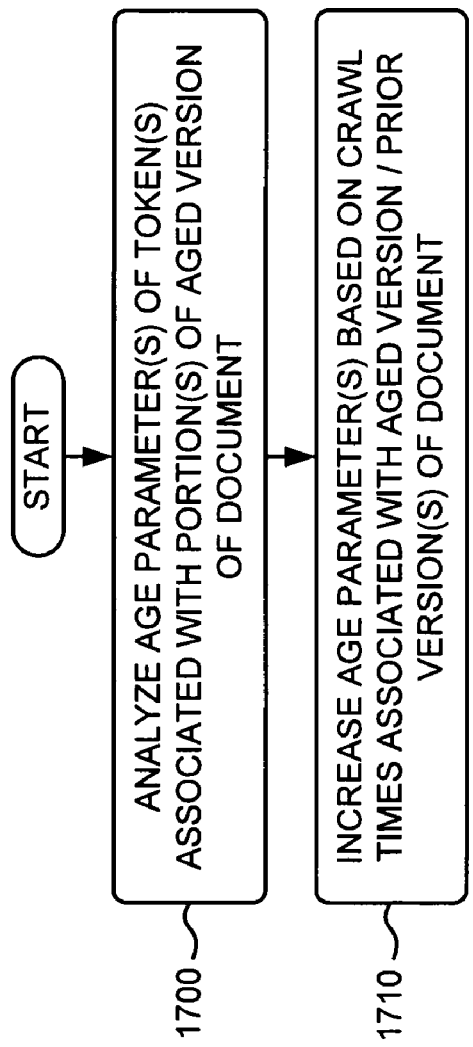

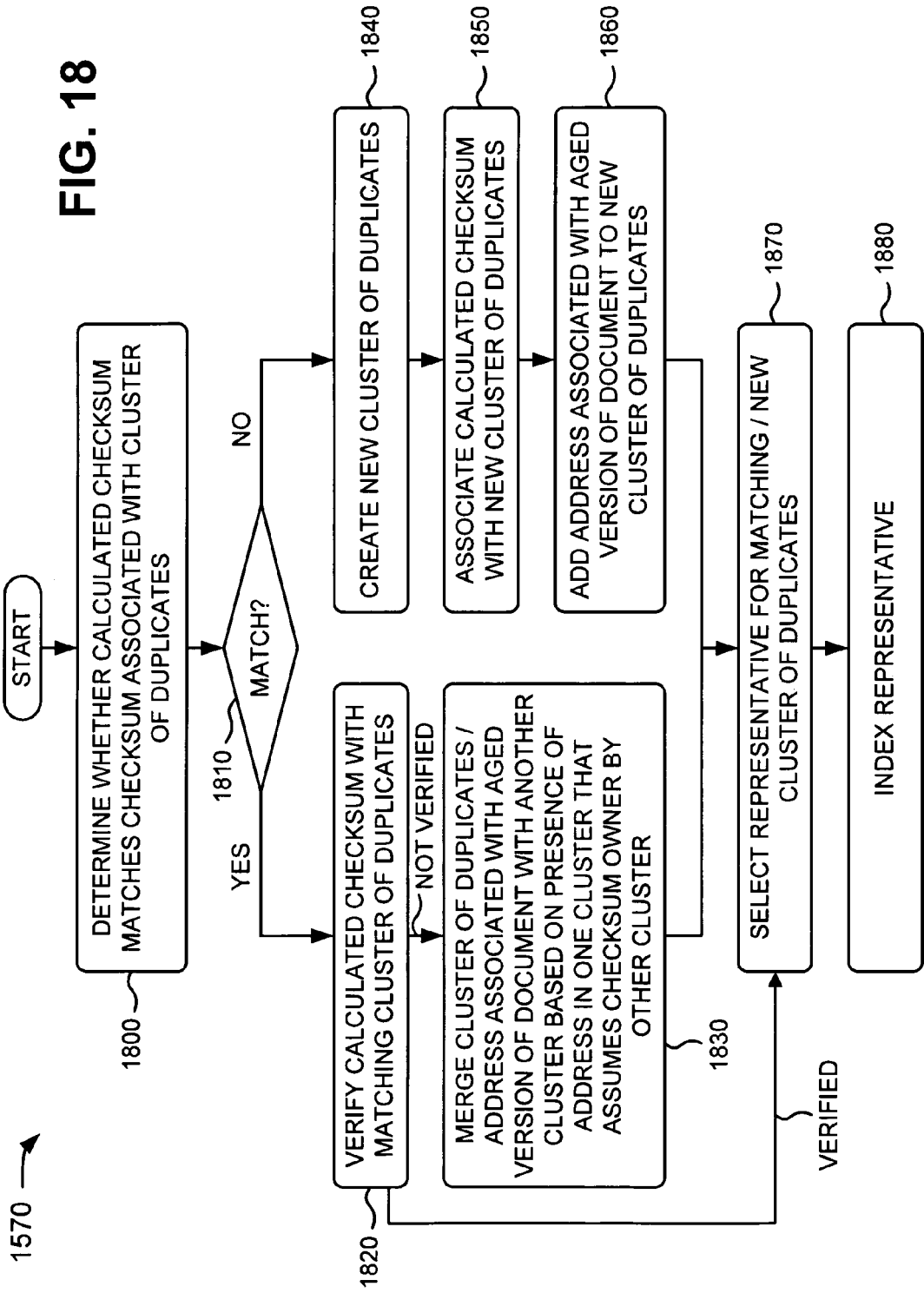

UPDATING SEARCH ENGINE DOCUMENT INDEX BASED ON CALCULATED AGE OF CHANGED PORTIONS IN A DOCUMENT

BACKGROUND

The World Wide Web ("web") contains a vast amount of information that is ever-changing. Existing web-based information retrieval systems use web crawlers to identify information on the web. A web crawler is a program that exploits the link-based structure of the web to browse the web in a methodical, automated manner.

A web crawler may start with addresses (e.g., Uniform Resource Locators (URLs)) of links to visit. For each address on the list, the web crawler may visit the document associated with the address. The web crawler may identify outgoing links within the visited document and add addresses associated with these links to the list of addresses.

An indexer creates an index of the documents crawled by the web crawler. A problem that indexers face is how to handle duplicate content on the web. For example, the same document may appear duplicated or substantially duplicated in different forms or at different places on the web.

Another problem that indexers face is high frequency content changes for the same document. For example, a document may include some content (e.g., a random advertisement or a related links section) that changes frequently, and some content that does not change over time. The document may also be a duplicate of one or more other documents. If the document is crawled at two different points in time, the document may include different advertisements. The indexer may be provided with two versions of the document corresponding to the different crawl times. Due to the changing advertisement, the indexer may not appropriately identify one of the versions of the document as a duplicate of the one or more other documents.

Still another problem that indexers face is what may be referred to as "crawl skew." For example, a document (e.g., a blog page) and its duplicate may include content that continuously grows over time and may cause crawl skew. The document and its duplicate may be crawled at two different points in time (e.g., the document may be crawled after the duplicate and may include new content not included in the duplicate). The indexer may be provided with the document and its duplicate. However, due to the new content, the indexer may not appropriately identify the document and the duplicate as a duplicates.

It is undesirable for the indexer to index all of the duplicate documents. For example, indexing duplicate documents wastes space in the index. Also, indexing duplicate documents, and thus making the duplicate documents available for serving as search results leads to an undesirable experience for the user. A user does not want to be presented with multiple documents containing the same, or substantially the same, content.

SUMMARY

According to one aspect, a computing device-implemented method may include receiving a document, comparing the document with a prior version of the document, and determining, based on the comparison, at least one first portion of the document that is common with the prior version of the document, and at least one second portion of the document that is uncommon with the prior version of the document. The method may also include determining an age of the at least one first portion and the at least one second portion, and determining whether the age of the at least one first portion is greater than or equal to an age threshold, and that the age of the at least one second portion is less than the age threshold. The method may also include calculating a checksum of the document based on the at least one first portion but not the at least one second portion, and storing the calculated checksum.

According to another aspect, a computing device-implemented system may include means for receiving an aged version of a document, means for comparing the aged version of the document with a prior version of the document, and means for determining at least one first portion of the aged version of the document that is common with the prior version of the document based on the comparison. The system may also include means for determining at least one second portion of the aged version of the document that is uncommon with the prior version of the document based on the comparison, means for determining an age of the at least one first portion and the at least one second portion, and means for determining whether the age of the at least one first portion is greater than or equal to an age threshold, and that the age of the at least one second portion is less than the age threshold. The system may further include means for calculating a checksum of the aged version of the document based on the at least one first portion but not the at least one second portion, means for determining whether the calculated checksum matches a checksum associated with a cluster of duplicate documents, and means for associating the aged version of the document with the cluster of duplicate documents when the calculated checksum matches the checksum associated with the cluster of duplicate documents.

According to yet another aspect, a system may include a memory to store a plurality of instructions, and a processor to execute instructions in the memory to: receive a document, compare the document with a prior version of the document, determine, based on the comparison, at least one first portion of the document that is common with the prior version of the document, and at least one second portion of the document that is uncommon with the prior version of the document, determine an age of the at least one first portion and the at least one second portion, determine whether the age of the at least one first portion is greater than or equal to an age threshold, and that the age of the at least one second portion is less than the age threshold, calculate a checksum of the document based on the at least one first portion but not the at least one second portion, and associate the document with a cluster of duplicate documents when the calculated checksum matches the checksum associated with the cluster of duplicate documents.

According to a further aspect, a computing device-implemented method may include receiving a document that includes new content and aged content, comparing the document with a prior version of the document that includes the aged content but not the new content, and separating the new content and the aged content based on the comparison. The method may also include determining ages associated with the new content and the aged content, determining whether the ages of the new content and the aged content are greater than or equal to an age threshold, calculating a checksum of the document based on the aged content when the age of the aged content is greater than or equal to the age threshold, and the age of the new content is less than the age threshold, and storing the calculated checksum.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5 depicts a diagram of exemplary functional components of a crawler engine of the crawler/indexer system illustrated in FIG. 4;

FIG. 6 illustrates a diagram of exemplary functional components of a document age analyzer of the crawler/indexer system depicted in FIG. 4;

FIG. 7 depicts a diagram of exemplary functional components of a crawl skew analyzer of the crawler/indexer system illustrated in FIG. 4;

FIGS. 8A and 8B illustrate exemplary portions of tables capable of being generated and/or maintained by the crawl skew analyzer depicted in FIG. 7;

FIG. 8C illustrates exemplary interactions between the table portions depicted in FIGS. 8A and 8B;

FIGS. 9 and 10 depict exemplary operations capable of being performed by the crawl skew analyzer illustrated in FIG. 7 on the portions of tables illustrated in FIGS. 8A and 8B;

FIG. 11 illustrates exemplary documents received during different crawl times and experiencing high frequency content changes;

FIGS. 12 and 13 depict exemplary documents experiencing crawl skew;

FIGS. 15-18 depict flow charts of an exemplary process for aging portions of a document, according to implementations described herein.

DETAILED DESCRIPTION

The following detailed description refers to the accompanying drawings. The same reference numbers in different drawings may identify the same or similar elements. Also, the following detailed description does not limit the invention.

Overview

In the description to follow, reference will be made to "documents" and "web sites." A "document," as the term is used herein, is to be broadly interpreted to include any machine-readable and machine-storable work product. A document may include, for example, an e-mail, a file, a combination of files, one or more files with embedded links to other files, a news group posting, a blog, a web advertisement, a Uniform Resource Locator (URL), etc. In the context of the Internet, a common document is a web page. Web pages often include textual information and may include embedded information (such as meta information, images, hyperlinks, etc.) and/or embedded instructions (such as Javascript, etc.). A "web site," as used herein, is to be broadly interpreted to include a collection of related documents, such as documents associated with a same host or organization. For example, the collection of related documents might include all or a subset of the documents associated with a traditional web site, directory, or sub-directory, or some other set of documents that are related to each other (e.g., on the same host or associated with the same organization).

In the context of indexing, the presence of crawl skew and documents with high frequency content changes may pose problems by wasting resources (e.g., computer, storage, and/or network resources) and degrading a user's search experience (e.g., by presenting multiple documents with essentially the same content). Implementations described herein may age one or more portions of such documents so that documents with high frequency content changes and/or documents that experience crawl skew may be kept in the same duplicate clusters as documents having the same and/or similar content.

Figure 1:
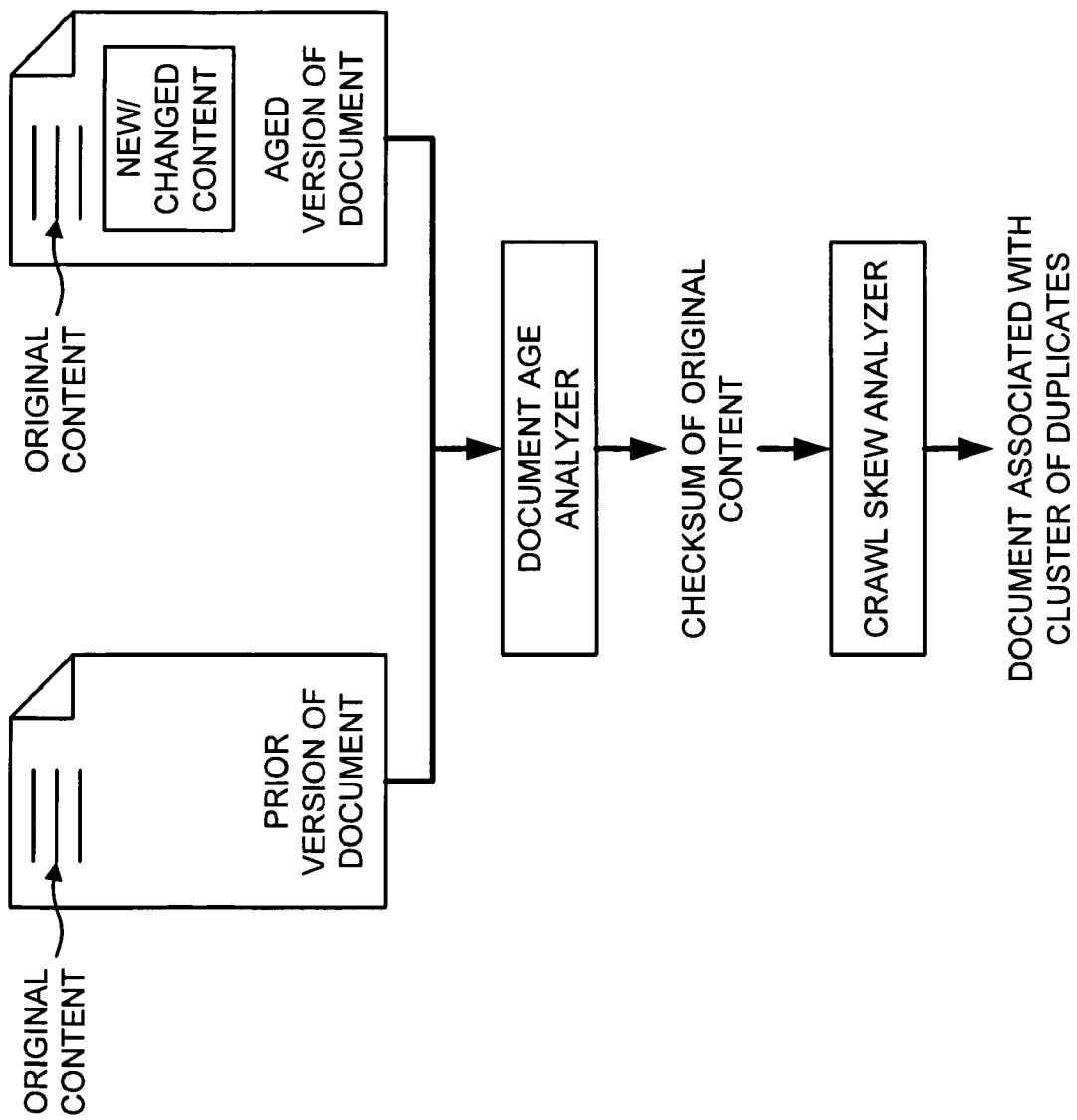
FIG. 1 depicts a diagram of an overview of an exemplary implementation described herein.

For example, in one exemplary implementation, as shown in FIG. 1, a prior version (e.g., a previously crawled version) of a document may include original content, and an aged version (e.g., a currently crawled version) of the document may include the original content, as well as new or changed content. A document age analyzer may analyze a prior version of the document and the aged version of the document. The document age analyzer may determine ages of portions of the document based on a comparison of the aged version of the document with the prior version of the document. The document age analyzer may identify portions of the aged version of the document with ages greater than an age threshold, and may calculate a checksum of the aged version of the document based on the identified portions (e.g., based on the original or aged content). A crawl skew analyzer may associate the aged version of the document with a cluster of duplicate documents (e.g., via a duplicate cluster identifier (ID)). Such an arrangement may ensure that the different versions of documents are associated with the same cluster of duplicate documents, which may improve duplicate clustering.

A "checksum," as the term is used herein, is to be broadly interpreted to include a hash function, a form of redundancy check, a way to protect the integrity of information and/or data by detecting errors in the information and/or data that are transmitted through space or time, or a mechanism that adds components of a message (e.g., asserted bits), and stores the resulting value.

Exemplary Network Configuration

Figure 2:
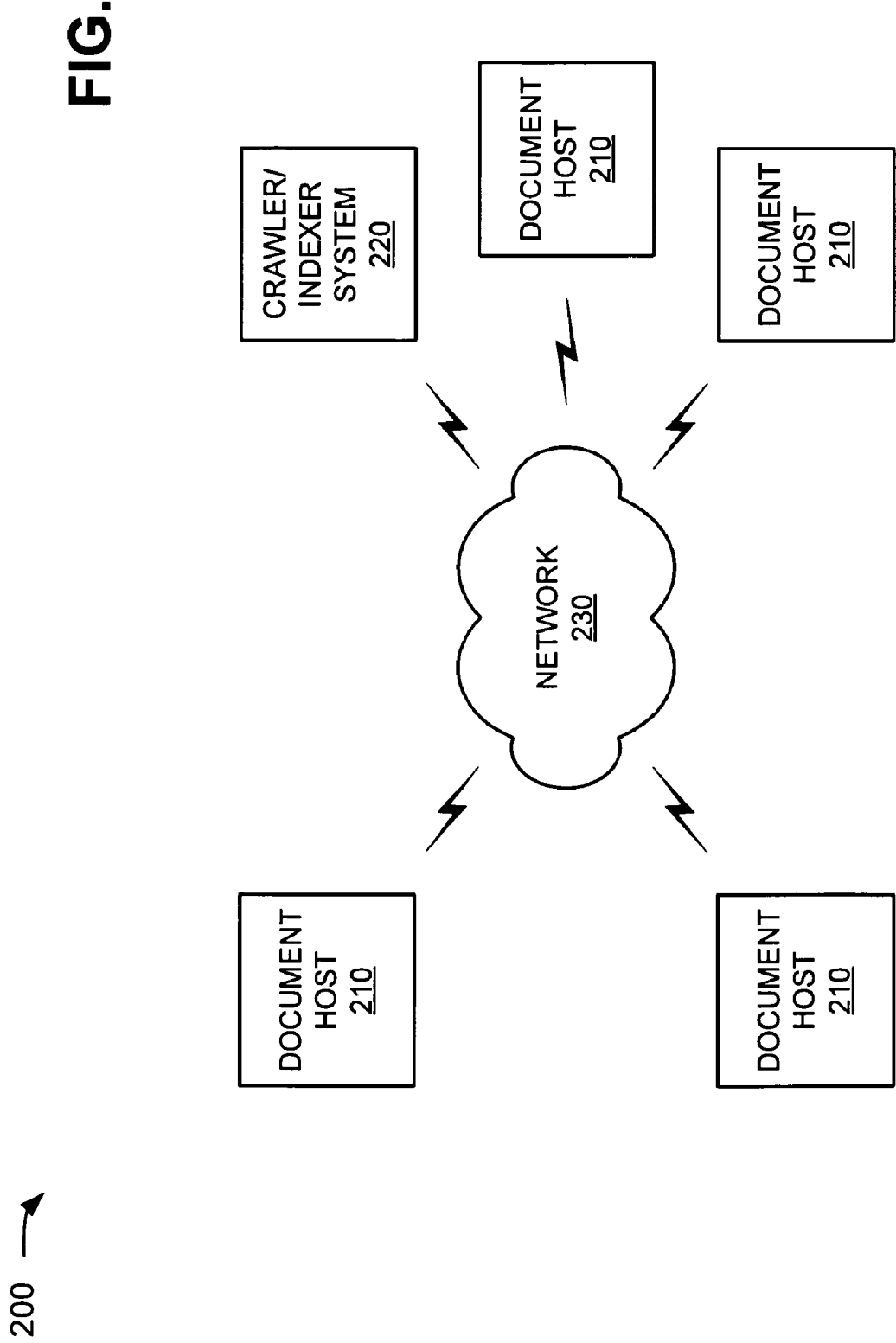
FIG. 2 illustrates a diagram of an exemplary network in which systems and methods described herein may be implemented.

FIG. 2 is a diagram of an exemplary network 200 in which systems and methods described herein may be implemented. As illustrated, network 200 may include multiple document hosts 210 connected to a crawler/indexer system 220 via a network 230. Four document hosts 210 and a single crawler/indexer system 220 have been illustrated as connected to network 230 for simplicity. In practice, there may be more, fewer, or a different arrangement of document hosts 210 and/or crawler/indexer systems 220.

Document hosts 210 may include entities that store and/or manage documents. An entity may be defined as a device, such as a stationary or portable computer, a personal digital assistant (PDA), a laptop computer, a telephone device, or another type of computation or communication device, a thread or process running on one of these devices, and/or an object executable by one of these devices.

Crawler/indexer system 220 may include an entity that crawls, processes, indexes, and/or maintains documents. For example, crawler/indexer system 220 may crawl a corpus of documents (e.g., web documents), index the documents, and/ or store information associated with the documents in a repository of documents. While crawler/indexer system 220 is shown as a single entity, it may be possible for crawler/indexer system 220 to be implemented as two or more separate (and possibly distributed) entities.

Network 230 may include a local area network (LAN), a wide area network (WAN), a telephone network, such as the Public Switched Telephone Network (PSTN) or a cellular network, an intranet, the Internet, or a combination of networks. Document hosts 210 and crawler/indexer system 220 may connect to network 230 via wired and/or wireless connections. The connections may either be direct or indirect connections.

Exemplary Crawler/Indexer System Architecture

Figure 3:
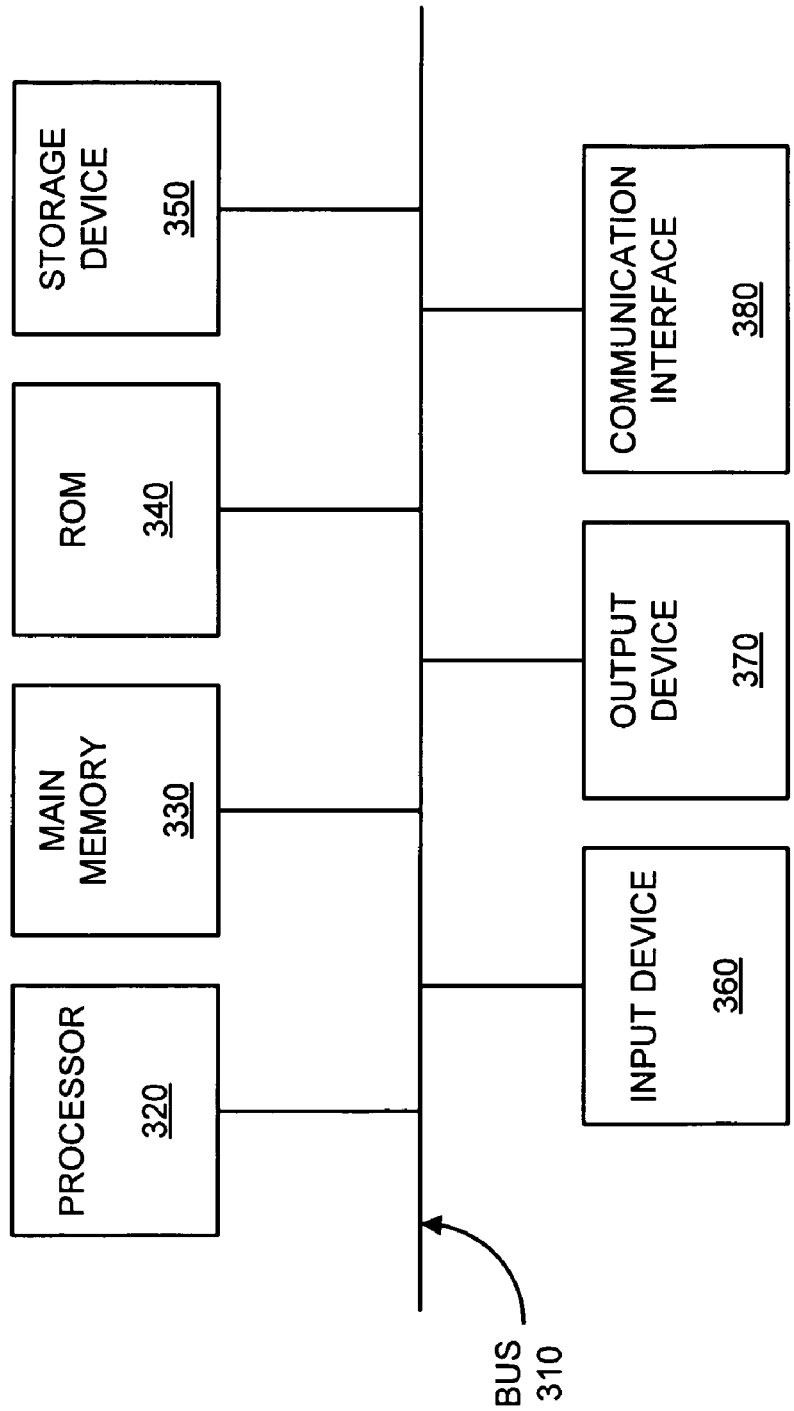
FIG. 3 depicts a diagram of exemplary components of a device that may correspond to document host and/or a crawler/indexer system of the network illustrated in FIG. 2.

FIG. 3 depicts a diagram of exemplary components of a device 300 that may correspond to a document host 210 and/or crawler/indexer system 220. As illustrated, device 300 may include a bus 310, a processor 320, a main memory 330, a read only memory (ROM) 340, a storage device 350, an input device 360, an output device 370, and a communication interface 380. Bus 310 may include a path that permits communication among the components of device 300.

Processor 320 may include a processor, a microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a component that permits an operator to input information to device 300, such as a keyboard, a mouse, a pen, voice recognition and/or biometric mechanisms, etc. Output device 370 may include a component that outputs information to the operator, including a display, a printer, a speaker, etc. Communication interface 380 may include any transceiver-like mechanism that enables device 300 to communicate with other devices and/or systems. For example, communication interface 380 may include components for communicating with another device or system via a network, such as network 230.

Device 300 may perform certain operations described herein. Device 300 may perform these operations in response to processor 320 executing software instructions contained in a computer-readable medium, such as memory 330. A computer-readable medium may be defined as a physical or logical memory device.

The software instructions may be read into memory 330 from another computer-readable medium, such as storage device 350, or from another device via communication interface 380. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, or additional components than depicted in FIG. 3. In still other implementations, one or more components of device 300 may perform one or more other tasks described as being performed by one or more other components of device 300.

Exemplary Crawler/Indexer System Functional Components

Figure 4:
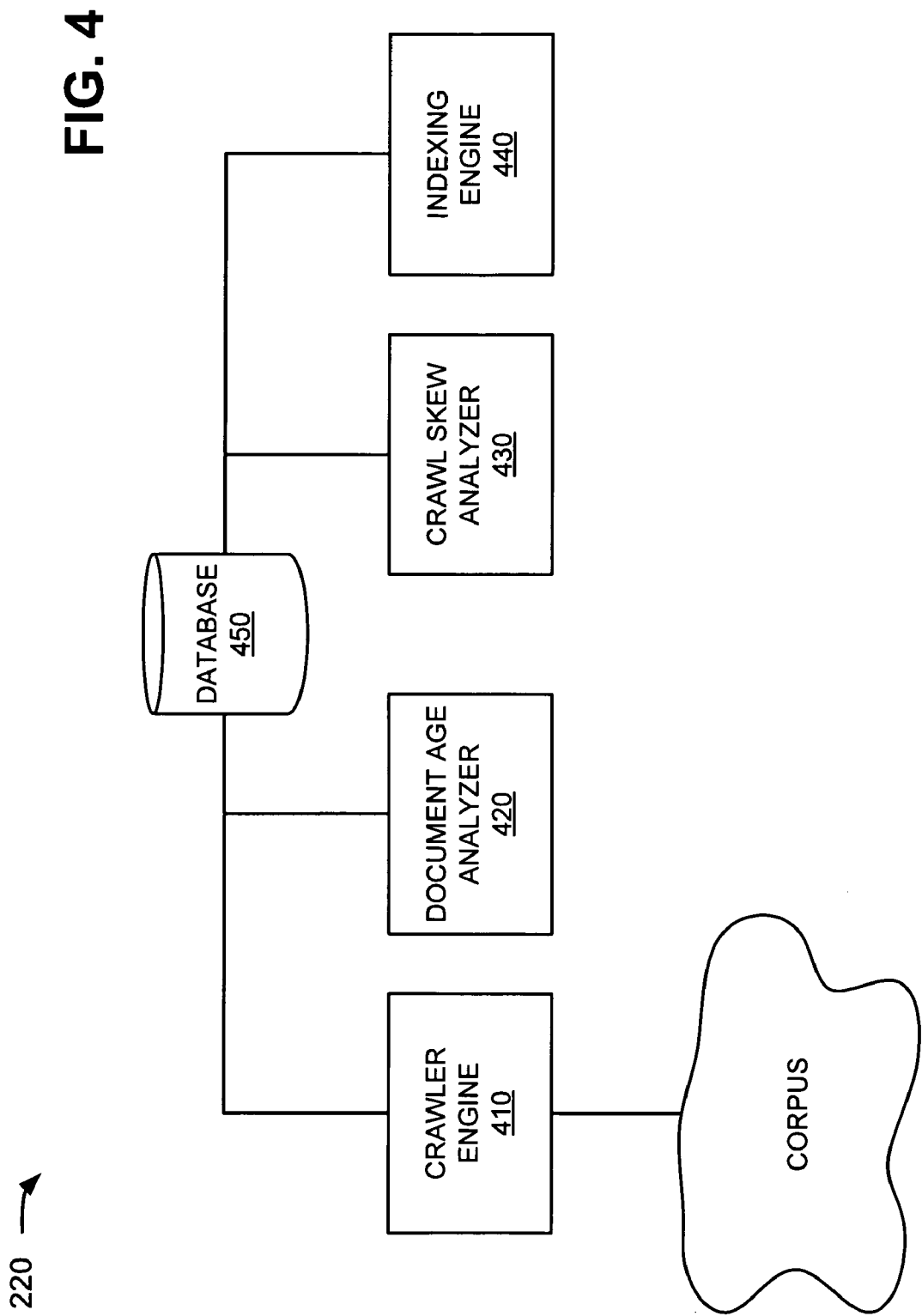
FIG. 4 illustrates a diagram of exemplary functional components of the crawler/indexer system of the network depicted in FIG. 2.

FIG. 4 is a diagram of exemplary functional components of crawler/indexer system 220. As illustrated, crawler/indexer system 220 may include a crawler engine 410, a document age analyzer 420, a crawl skew analyzer 430, and an indexing engine 440 connected to a database 450. In one implementation, crawler engine 410, document age analyzer 420, crawl skew analyzer 430, and/or indexing engine 440 may be implemented by software and/or hardware within crawler/indexer system 220. In another implementation, crawler engine 410, document age analyzer 420, crawl skew analyzer 430, and/or indexing engine 440 may be implemented by software and/or hardware within another device or a group of devices separate from or including crawler/indexer system 220.

Crawler engine 410 may operate from a list of addresses to fetch corresponding documents from a corpus of documents (e.g., the web). Crawler engine 410 may extract the addresses (e.g., URLs) associated with the outgoing links in the document and may add the addresses to the list of addresses to be crawled. Crawler engine 410 may also store information associated with the document, such as all or part of the document, in database 450. Further details of crawler engine 410 are provided below in connection with, for example, FIG. 5.

Document age analyzer 420 may analyze versions of a document that has been crawled (e.g., via crawler engine 410) at different points in time. For example, in one implementation, document age analyzer 420 may analyze a prior version (e.g., a previously crawled version) of a document and an aged version (e.g., a currently crawled version) of the document. Document age analyzer 420 may determine ages of portions of the document based on a comparison of the aged version of the document with the prior version of the document. Document age analyzer 420 may identify portions of the document with ages greater than an age threshold, and may calculate a checksum of the aged version of the document based on the identified portions. Further details of document age analyzer 420 are provided below in connection with, for example, FIG. 6.

Crawl skew analyzer 430 may associate a calculated checksum (e.g., the checksum calculated by document age analyzer 420) with a cluster of duplicate documents. For example, in one implementation, crawl skew analyzer 430 may associate the calculated checksum with a cluster of duplicate documents (e.g., via a duplicate cluster ID) associated with a checksum that matches the calculated checksum. Further details of crawl skew analyzer 430 are provided below in connection with, for example, FIG. 7.

Indexing engine 440 may operate upon documents crawled by crawler engine 410 and/or processed by document age analyzer 420 and/or crawl skew analyzer 430. For example, indexing engine 440 may create an index of such documents, and may store the index in database 450. Indexing engine 440 may operate upon a cluster of duplicate documents to select one of these documents as representative of the cluster. For example, indexing engine 440 may index portions of the document with a certain minimum age (e.g., as identified by document age analyzer 420).

Database 450 may be embodied within a single memory device or within multiple (possibly distributed) memory devices. Database 450 may store the list of addresses used by crawler engine 410, information associated with documents crawled by crawler engine 410, a list of checksums compiled by document age analyzer 420, a list of checksums and associated duplicate cluster identifiers (IDs) compiled by crawl skew analyzer 430, a list of duplicate cluster IDs and associated address (e.g., URLs) compiled by crawl skew analyzer 430, and/or the index generated by indexing engine 440.

Although FIG. 4 shows exemplary functional components of crawler/indexer system 220, in other implementations, crawler/indexer system 220 may contain fewer, different, or additional functional components than depicted in FIG. 4. In still other implementations, one or more functional components of crawler/indexer system 220 may perform one or more other tasks described as being performed by one or more other functional components of crawler/indexer system 220.

Exemplary Crawler Engine Functional Components

FIG. 5 is a diagram of exemplary functional components of crawler engine 410. As illustrated, crawler engine 410 may include fetch bots 500 and a content manager 510. In one implementation, crawler engine 410 may be implemented by software and/or hardware within crawler/indexer system 220. In another implementation, crawler engine 410 may be implemented by software and/or hardware within another device or a group of devices separate from or including crawler/indexer system 220.

A fetch bot 500 may fetch a document from a corpus of documents, and may provide the fetched document to content manager 510. Fetch bots 500 may operate from a list of addresses provided by content manager 510.

Content manager 510 may parse a document fetched by a fetch bot 500 to identify outgoing links that the fetched document contains. Content manager 510 may add addresses associated with the outgoing links to a list of addresses that it maintains. Content manager 510 may provide addresses from the list to fetch bots 500 as instructions for fetch bots 500 to fetch (i.e., crawl) the corresponding documents. Content manager 510 may also store information 520 associated with the fetched documents (e.g., all or part of the fetched documents) in database 450 (FIG. 4).

Although FIG. 5 shows exemplary functional components of crawler engine 410, in other implementations, crawler engine 410 may contain fewer, different, or additional functional components than depicted in FIG. 5. In still other implementations, one or more functional components of crawler engine 410 may perform one or more other tasks described as being performed by one or more other functional components of crawler engine 410.

Exemplary Document Age Analyzer Functional Components

FIG. 6 is a diagram of exemplary functional components of document age analyzer 420. As illustrated, document age analyzer 420 may include a content age assigner 600, an aged content identifier 610, and a checksum calculator 620. In one implementation, document age analyzer 420 may be implemented by software and/or hardware within crawler/indexer system 220. In another implementation, document age analyzer 420 may be implemented by software and/or hardware within another device or a group of devices separate from or including crawler/indexer system 220.

Content age assigner 600 may retrieve a set of documents 630 from database 450, and may analyze documents 630. In one implementation, content age assigner 600 may analyze information associated with documents 630 (e.g., addresses, contents, metadata (e.g., refresh meta tags, refresh headers, status codes, crawl times, etc.) to determine ages of portions of documents 630. For example, content age assigner 600 may receive an aged version of a document (e.g., a document retrieved from a current crawl), and may compare the aged version of the document with one or more prior versions of the document (e.g., versions of the document retrieved from prior crawls) to identify aged (e.g., reused or common) and/or new (or changed) content 640 associated with the document. Content age assigner 600 may provide aged/new content 640 to aged content identifier 610.

Content age assigner 600 may utilize a variety of techniques to compare the aged and prior version(s) of the document. In one implementation, for example, the versions of the document may be stored as a sequence of portions or tokens (e.g., words, phrases, one or more characters, etc.). An age field or parameter may be associated with each token, and may indicate an age of the token. Content age assigner 600 may determine the age parameter of the token by comparing crawl times associated with the versions of the document. In one implementation, content age assigner 600 may set a token's age parameter based on a difference between crawl times of a document associated with the token (e.g., using a counting function). For example, if it is currently 6:00 AM and a prior version of a document was crawled at 1:00 AM, content age assigner 600 may set a token's age parameter to a value (e.g., five). If an aged version of the document was crawled at 2:00 AM, content age assigner 600 may set the same token's age parameter to another value (e.g., four).

Content age assigner 600 may compare the age parameters to an age threshold (e.g., a minimum age threshold), and may determine if a document token (e.g., a portion of the document) is aged (e.g., greater than or equal to the minimum age threshold) and/or is new (e.g., less than the minimum age threshold) based on the age parameters. Further details of tokens and age parameters are provided below in connection with, for example, FIGS. 11-13.

Alternatively and/or additionally, content age assigner 600 may identify aged/new content 640 using a longest common subsequence (LCS) process or a winnowing process. The longest common subsequence process may include determining a longest subsequence common to sequences in a set of sequences. In one implementation, content age assigner 600 may identify aged content as a longest subsequence (e.g., portions of a document) common to both aged and prior versions of the document. Content age assigner 600 may identify new content as portions of the document uncommon to both the aged and prior versions of the document. The LCS process may include an algorithm that compares an aged document with a small number of previous documents. Content age assigner 600 may utilize the winnowing process (e.g., as set forth in Schleimer et al., "Winnowing: Local Algorithms for Document Fingerprinting," Proceedings Of The 2003 ACM SIGMOD International Conference On Management Of Data (June 2003), the disclosure of which is incorporated by reference herein in its entirety) to determine a set of fingerprints for each version of the document, to identify aged content based on an intersection of the sets of fingerprints, and to identify new content based on content from the new document falling outside of the intersection of the sets of fingerprints. The winnowing process may include an approximate approach that efficiently compares re-crawled documents with a larger number of previous versions of the document.

Aged content identifier 610 may receive aged/new content 640 from content age assigner 600, and may remove new (or changed) content 650 from aged/new content 640. Aged content identifier 610 may provide new content 650 to database 450. New content 650 may be indexed by indexing engine 440, depending upon the information contained in new content 650. For example, if new content 650 relates to the content of the document being analyzed by document age analyzer 420, new content 650 may be indexed by indexing engine 440. In another example, if new content 650 relates to an advertisement, new content 650 may not be indexed by indexing engine 440. As further shown in FIG. 6, aged content identifier 610 may remove new content 650 from aged/new content 640, and may provide aged content 660 to checksum calculator 620 and/or database 450.

Checksum calculator 620 may receive aged content 660 from aged content identifier 610, and may calculate a checksum 670 of aged content 660. In one implementation, aged content 660 may include one or more portions of the document with age(s) greater than or equal to the minimum age threshold. Thus, checksum calculator 620 may calculate a checksum of the document based on the identified one or more portions of the document with age(s) greater than or equal to the minimum age threshold. Checksum calculator 620 may calculate checksum 670 using typical checksum calculation techniques. For example, checksum calculator 620 may calculate checksum 670 by adding components (e.g., bits) of associated aged content 660, and outputting a resulting value. As further shown in FIG. 6, checksum calculator 620 may provide checksum 670 to database 450.

Because checksum calculator 620 calculates the checksum of aged content 660, different versions of documents with high frequency content changes (e.g., new content 650) may be associated with the same duplicate cluster. This may by prevent waste of resources (e.g., computer, storage, and/or network resources) and degradation of a user's search experience (e.g., by presenting multiple documents with essentially the same content).

Although FIG. 6 shows exemplary functional components of document age analyzer 420, in other implementations, document age analyzer 420 may contain fewer, different, or additional functional components than depicted in FIG. 6. In still other implementations, one or more functional components of document age analyzer 420 may perform one or more other tasks described as being performed by one or more other functional components of document age analyzer 420.

Exemplary Crawl Skew Analyzer Functional Components

FIG. 7 is a diagram of exemplary functional components of crawl skew analyzer 430. As illustrated, crawl skew analyzer 430 may include a checksum/cluster identifier (ID) associator 700, a cluster ID/URL associator 710, and a checksum comparer 720. In one implementation, crawl skew analyzer 430 may be implemented by software and/or hardware within crawler/indexer system 220. In another implementation, crawl skew analyzer 430 may be implemented by software and/or hardware within another device or a group of devices separate from or including crawler/indexer system 220.

Crawl skew analyzer 430 may address the problem of crawl skew by implementing a "checksum ownership" process. For example, assume that a prior version of a document (e.g., a blog page) and its duplicate contain aged content, that an aged (e.g., re-crawled) version of the document contains the aged content and new content (e.g., a new blog posting), and that the duplicate does not contain the new content. When the new content becomes old enough to be considered in the age-based checksum described above (e.g., checksum 670), the checksums associated with the aged version of the document and the duplicate may be different. Thus, the aged version of document and its duplicate may not be considered duplicates. The checksum ownership process may address such crawl skew by enabling the aged version of the document and the duplicate to remain as duplicates for an extended period of time.

Checksum/cluster ID associator 700 may retrieve cluster identifiers (IDs) 730 (e.g., that may identify one or more clusters of duplicate documents) and checksums 740 (e.g., checksum 670) from database 450, and may associate one or more checksums 740 with each of cluster IDs 730. Checksum/cluster ID associator 700 may provide associated checksums/cluster IDs 750 to database 450 and/or to checksum comparer 720. In one implementation, for example, checksum/cluster ID associator 700 may compare a checksum 740 with a checksum associated with a specific cluster ID 730, and may associate checksum 740 with the specific cluster ID 730 if checksum 740 matches the checksum associated with the specific cluster ID 730.

FIG. 8A illustrates an exemplary portion 800 of a table capable of being generated and/or maintained (e.g., updated) by checksum/cluster ID associator 700. As illustrated, table portion 800 may include a checksum column 810, a cluster ID column 820, and a number of entries (e.g., entries 830 and 840) associated with checksum column 810 and cluster ID column 820. The information contained in table portion 800 may correspond to associated checksums/cluster IDs 750 provided by checksum/cluster ID associator 700. In one implementation, table portion 800 may be stored in a storage device (e.g., main memory 330, ROM 340, and/or storage device 350) associated with crawler/indexer system 220, such as database 450. In other implementations, table portion 800 may be stored in a storage device associated with another device that may be accessed by crawler/indexer system 220 (e.g., via communication interface 380).

Checksum column 810 may include information associated with checksums 740 (e.g., checksum 670) retrieved from database 450 by checksum/cluster ID associator 700. For example, checksum column 810 may include entries 830 for a first checksum (e.g., "CHECKSUM 1"), a second checksum (e.g., "CHECKSUM 2"), and a third checksum (e.g., "CHECKSUM 3"), and entry 840 for a fourth checksum (e.g., "CHECKSUM 4").

Cluster ID column 820 may include information associated with cluster IDs 730 retrieved from database 450 by checksum/cluster ID associator 700. For example, cluster ID column 820 may include entries 830 for a first cluster ID (e.g., "CLUSTER ID1"), and entry 840 for a second cluster ID (e.g., "CLUSTER ID2"). As further shown in FIG. 8A, the first and second checksums of entries 830 may be associated with the first cluster ID, and the third and fourth checksums of entry 840 may be associated with the second cluster ID.

Returning to FIG. 7, cluster ID/URL associator 710 may retrieve cluster identifiers (IDs) 730 (e.g., that may identify one or more clusters of duplicate documents) and addresses (e.g., URLs) 760 (e.g., that may identify documents associated with checksums 740) from database 450, and may associate each of cluster IDs 730 with one or more URLs 760. Cluster ID/URL associator 710 may provide associated cluster IDs/URLs 770 to database 450 and/or to checksum comparer 720. In one implementation, for example, cluster ID/URL associator 710 may associate a specific cluster ID 730 with URLs that identify documents associated with checksums 740 that match (or substantially match) the checksum associated with the specific cluster ID 730.

FIG. 8B illustrates an exemplary portion 850 of a table capable of being generated and/or maintained (e.g., updated) by cluster ID/URL associator 710. As illustrated, table portion 850 may include a cluster ID column 860, an address column 870, and a number of entries (e.g., entries 880 and 890) associated with cluster ID column 860 and address column 870. The information contained in table portion 850 may correspond to associated cluster IDs/URLs 770 provided by cluster ID/URL associator 710. In one implementation, table portion 850 may be stored in a storage device (e.g., main memory 330, ROM 340, and/or storage device 350) associated with crawler/indexer system 220, such as database 450. In other implementations, table portion 850 may be stored in a storage device associated with another device that may be accessed by crawler/indexer system 220 (e.g., via communication interface 380).

Cluster ID column 860 may include information associated with cluster IDs 730 retrieved from database 450 by cluster ID/URL associator 710. For example, cluster ID column 860 may include entries 880 for a first cluster ID (e.g., "CLUSTER ID1"), and entries 890 for a second cluster ID (e.g., "CLUSTER ID2").

Address column 870 may include information associated with URLs 760 retrieved from database 450 by cluster ID/URL associator 710. For example, address column 870 may include entries 880 for a first URL (e.g., "A.COM") and a second URL (e.g., "B.COM"), and entries 890 for a third URL (e.g., "C.COM") and a fourth URL (e.g., "D.COM"). As further shown in FIG. 8B, the first and second URLs of entries 880 may be associated with the first cluster ID (i.e., they are duplicated of each other), and the third and fourth URLs of entries 890 may be associated with the second cluster ID.

In one example, as depicted in FIG. 8C, it may be assumed that two clusters (e.g., CLUSTER ID1 and CLUSTER ID2) both contain two documents, as per table portion 850 (FIG. 8B). For example, CLUSTER ID1 may contain "A.COM" and "B.COM," and CLUSTER ID2 may contain "C.COM" and "D.COM." Further, as per table portion 800 (FIG. 8A), there may be two checksums, each of which may be associated with and/or owned by one of the two clusters. This situation may have arisen because both "A.COM" and "B.COM" may have only included content that resulted in CHECKSUM 1 or CHECKSUM 2, whereas "C.COM" and "D.COM" may have only included content that resulted in CHECKSUM 3 or CHECKSUM 4. At some point in time, one of these documents may be crawled, and, at which time, the content may be considered to be new and hence removable, which may produce more checksums to be owned by the same clusters. It may be further assumed that the content of "C.COM" and "D.COM" is an amended version of the content of "A.COM" and "B.COM" (e.g., content with an additional paragraph). At some point in time, "A.COM" may begin to assume the content of "C.COM" (or "D.COM"). In other words, the additional paragraph may be added to "A.COM." The additional paragraph may be considered new content and therefore may be disregarded in the checksum computation until enough time passes. Therefore, "A.COM" may remain in its cluster with "B.COM." Half-way through the waiting period, the additional paragraph may also be added to "B.COM." When the waiting period for "A.COM" is complete, it may assume CHECKSUM 3/4, as indicated by reference number 891 in FIG. 8C, but it may take time for "B.COM" to also assume CHECKSUM 3/4. If "A.COM" has assumed CHECKSUM 3/4, it may be clustered with "C.COM" and "D.COM." On the other hand, "A.COM" and "B.COM" may remain clustered. This may be resolved by merging the two clusters, i.e., creating a new cluster identifier (e.g., CLUSTER ID3) that may correspond to CHECKSUMS 1-4 in table portion 800, as indicated by reference number 892. Subsequently, table portion 850 may be updated, as indicated by reference number 893, so that the four documents (e.g., "A.COM," "B.COM," "C.COM," and "D.COM") may belong to CLUSTER ID3, and CHECKSUMS 1-4 may be owned by CLUSTER ID3.

In one exemplary implementation, checksum comparer 720 may compare the checksum (e.g., "CHECKSUM 3/4") associated with "A.COM" to the checksum column of table portion 800 to determine if the checksum (e.g., "CHECKSUM 3/4") matches any of the checksum entries provided in the checksum column. Checksum comparer 720 may determine that "A.COM" may be clustered with "C.COM" and "D.COM," but may remain clustered with "B.COM." Checksum comparer 720 may provide the checksum (e.g., "CHECKSUM 3/4") associated with "A.COM" to checksum/cluster ID associator 700 and cluster ID/URL associator 710. Checksum/cluster ID associator 700 may receive the checksum (e.g., "CHECKSUM 3/4") associated with "A.COM", and may create a new entry in table portion 800 that includes multiple checksums (e.g., "CHECKSUMS 1-4") and a new cluster ID (e.g., "CLUSTER ID3"). Cluster ID/URL associator 710 may receive the checksums (e.g., "CHECKSUMS 1-4"), and may update table portion 850 so that the new cluster ID (e.g., "CLUSTER ID3") is associated with the four documents (e.g., "A.COM," "B.COM," "C.COM," and "D.COM").

Returning to FIG. 7, checksum comparer 720 may receive associated checksums/cluster IDs 750 from checksum/cluster ID associator 700, may receive associated cluster IDs/URLs 770 from cluster ID/URL associator 710, and may receive checksums 740 and/or URLs 760. Checksum comparer 720 may determine if calculated checksums (e.g., checksums 740) match checksums associated with a cluster ID (e.g., matches checksums provided in associated checksum/cluster ID 750). Checksum comparer 720 may compare calculated checksums (e.g., checksums 740) with checksums provided in associated checksums/cluster IDs 750 (e.g., with checksums provided in table portion 800 (FIG. 8A)). If the calculated checksums match one of the checksums provided in associated checksums/cluster IDs 750, checksum comparer 720 may provide matching checksums 780 to checksum/cluster ID associator 700 and cluster ID/URL associator 710. Checksum/cluster ID associator 700 may receive matching checksums 780, and may verify matching checksums 780 with corresponding cluster IDs, as described above in connection with checksum/cluster ID associator 700 and in connection with FIG. 8A. Cluster ID/URL associator 710 may receive matching checksums 780, and may add URLs associated with checksums 780 to the corresponding cluster IDs, as described above in connection with cluster ID/URL associator 710 and in connection with FIG. 8B.

To illustrate this, FIG. 9 depicts exemplary operations capable of being performed by crawl skew analyzer 430 on table portions 800 and 850 illustrated in FIGS. 8A and 8B. For this example, it is assumed that checksum comparer 720 receives a new URL (e.g., "E.COM") that includes checksum (e.g., "CHECKSUM 1"), as indicated by reference number 910. Checksum comparer 720 may compare the checksum (e.g., "CHECKSUM 1") to the checksum column of table portion 800 to determine if the checksum (e.g., "CHECKSUM 1") matches any of the checksum entries provided in the checksum column. As further shown in FIG. 9, checksum comparer 720 may determine whether the checksum (e.g., "CHECKSUM 1") matches the first entry of the checksum column, as indicated by reference number 920. Checksum comparer 720 may provide the matching checksum (e.g., "CHECKSUM 1") to checksum/cluster ID associator 700 and cluster ID/URL associator 710. Checksum/cluster ID associator 700 may receive the matching checksum (e.g., "CHECKSUM 1"), and may verify the matching checksum (e.g., "CHECKSUM 1") with a corresponding cluster ID (e.g., "CLUSTER ID1"). Cluster ID/URL associator 710 may receive the matching checksum (e.g., "CHECKSUM 1"), and may create a new entry 930 in table portion 850 that includes the cluster ID (e.g., "CLUSTER ID1") and the URL (e.g., "E.COM") associated with the matching checksum (e.g., "CHECKSUM 1"), as indicated by reference number 940.

Returning to FIG. 7, if the calculated checksums do not match one of the checksums provided in associated checksums/cluster IDs 750, checksum comparer 720 may provide non-matching checksums 790 to checksum/cluster ID associator 700 and cluster ID/URL associator 710. Checksum/cluster ID associator 700 may receive non-matching checksums 790, and may associate non-matching checksums 790 with corresponding new cluster IDs. Cluster ID/URL associator 710 may receive non-matching checksums 790, and may add URLs associated with non-matching checksums 790 to the corresponding new cluster IDs.

To illustrate this, FIG. 10 depicts exemplary operations capable of being performed by crawl skew analyzer 430 on table portions 800 and 850 illustrated in FIGS. 8A and 8B. For this example, it is assumed that checksum comparer 720 receives a new URL (e.g., "E.COM") that includes checksum (e.g., "CHECKSUM 5"), as indicated by reference number 1010. Checksum comparer 720 may compare the checksum (e.g., "CHECKSUM 5") to the checksum column of table portion 800 to determine if the checksum (e.g., "CHECKSUM 5") matches any of the checksum entries provided in the checksum column. As further shown in FIG. 10, checksum comparer 720 may determine whether the checksum (e.g., "CHECKSUM 5") does not match an entry of the checksum column, as indicated by reference number 1020. Checksum comparer 720 may provide the non-matching checksum (e.g., "CHECKSUM 5") to checksum/cluster ID associator 700 and cluster ID/URL associator 710. Checksum/cluster ID associator 700 may receive the non-matching checksum (e.g., "CHECKSUM 5"), and may create an entry in table portion 800 that includes the non-matching checksum (e.g., "CHECKSUM 5") and a new cluster ID (e.g., "CLUSTER ID3"), as indicated by reference number 1030. Cluster ID/URL associator 710 may receive the non-matching checksum (e.g., "CHECKSUM 5"), and may create a new entry 1040 in table portion 850 that includes the new cluster ID (e.g., "CLUSTER ID3") and the URL (e.g., "E.COM") associated with the non-matching checksum (e.g., "CHECKSUM 5"), as indicated by reference number 1050.

Although FIG. 7 shows exemplary functional components of crawl skew analyzer 430, in other implementations, crawl skew analyzer 430 may contain fewer, different, or additional functional components than depicted in FIG. 7. In still other implementations, one or more functional components of crawl skew analyzer 430 may perform one or more other tasks described as being performed by one or more other functional components of crawl skew analyzer 430.

Exemplary Functions Performed by Document Age Analyzer and Crawl Skew Analyzer

Figure 13:
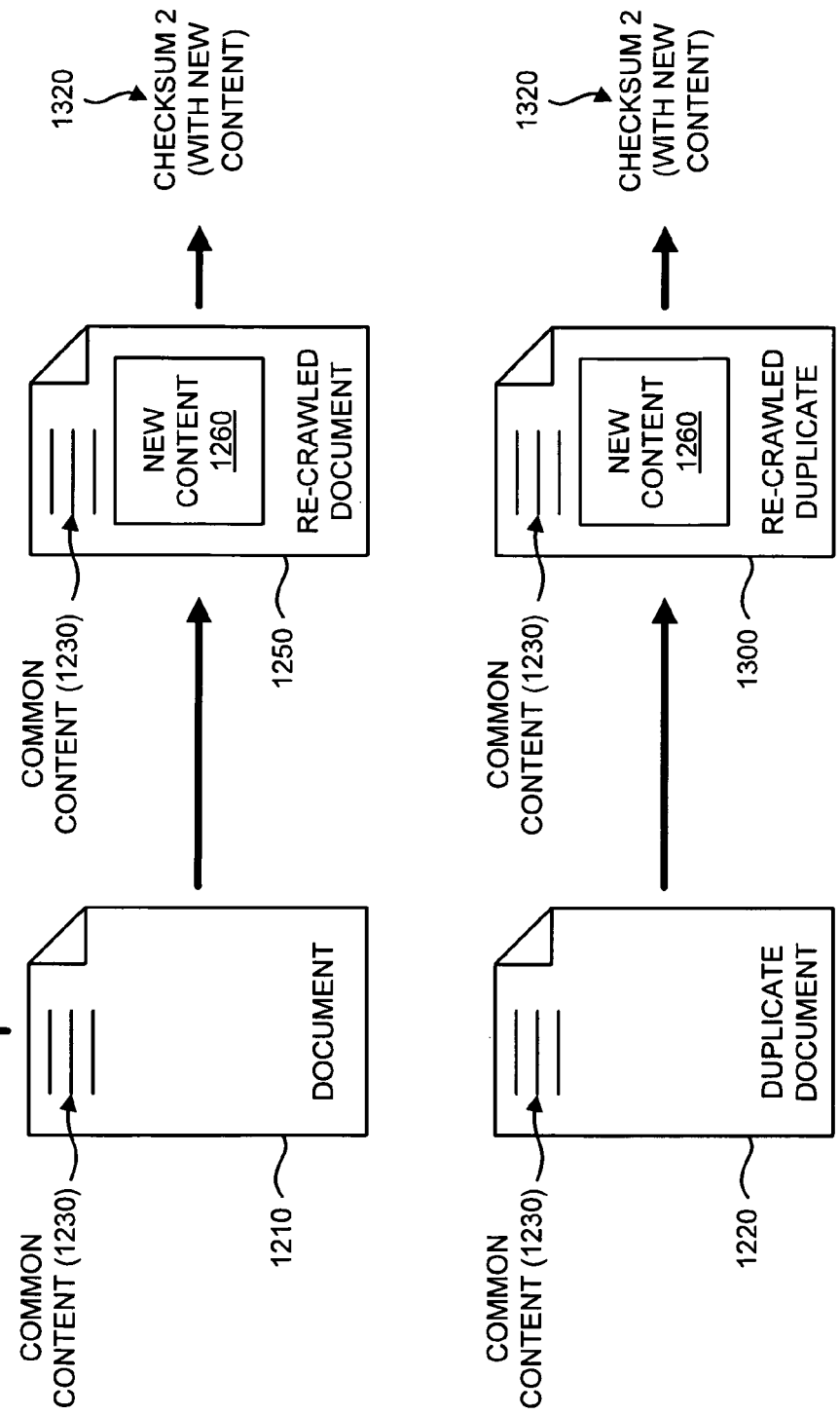

FIGS. 11-13 illustrate exemplary functions capable of being performed by document age analyzer 420 and crawl skew analyzer 430. For example, FIG. 11 depicts exemplary documents 1100 received during different crawl times that are experiencing high frequency content changes. As shown in FIG. 11, a crawl 1105 of a document 1110 may occur on day "X," at 1:00 AM, and a re-crawl 1115 of document 1110 may occur on day "X," at 2:00 AM. Document 1110 may include a sequence of portions or tokens 1120 (e.g., words, phrases, one or more characters, etc.). Tokens 1120 associated with crawl 1105 may include unchanging content 1125 and changing content 1130 (e.g., "advertisement 1"). Tokens associated with re-crawl 1115 may include unchanging content 1125 and changing content 1135 (e.g., "advertisement 2"). Age parameters 1140-1155 may be associated with each token 1120, and may indicate an age of each token 1120. Document age analyzer 420 (e.g., content age assigner 600 of document age analyzer 420) may set age parameters 1140-1155 of tokens 1120 based on a crawl time associated with document 1110. For example, since changing content 1130 is newer than unchanging content 1125, content age assigner 600 may set age parameter 1145 of changing content 1130 to a value (e.g., "0") that is less than age parameter 1140 (e.g., "16") of unchanging content 1125.

As further shown in FIG. 11, since changing content 1135 is newer than unchanging content 1125, content age assigner 600 may set age parameter 1155 of changing content 1135 to a value (e.g., "0") that is less than age parameter 1150 (e.g., "17") of unchanging content 1125. Content age assigner 600 may compare age parameters 1140-1155 to an age threshold (e.g., a minimum age threshold), and may determine if portions of documents 1120 and 1140 are aged (e.g., greater than or equal to the minimum age threshold) and/or are new (e.g., less than the minimum age threshold) based on age parameters 1150 and 1155.

Document age analyzer 420 (e.g., checksum calculator 620 of document age analyzer 420) may calculate checksums 1160 of the crawled and re-crawled versions of document 1110. As shown in FIG. 11, checksums 1160 of the crawled and re-crawled versions of document 1110 may match (e.g., may equal "CHECKSUM") because checksum calculator 620 may exclude changing portions 1130 and 1135 from the calculation (i.e., may calculate checksums 1160 based only on unchanging content 1125). Thus, document 1110 may remain associated with the same duplicate cluster despite including a portion experiencing high frequency content changes.

FIGS. 12 and 13 depict exemplary documents 1200 and 1300 experiencing crawl skew. As shown in FIG. 12, a document 1210 (e.g., a blog page) and another document 1220 may include common content 1230. Using the age-based checksum technique described above, checksums 1240 (e.g., "CHECKSUM 1") may be calculated for documents 1210 and 1220. Checksums 1240 may match (e.g., indicating that documents 1210 and 1220 are duplicates) since both documents 1210 and 1220 may include common content 1230. Document 1210 may be re-crawled (e.g., as shown by re-crawled document 1250) at a later time, but document 1220 may not be re-crawled. Re-crawled document 1250 may contain common content 1230 and new content 1260 (e.g., a new blog posting), and document 1220 may still include only common content 1230. Thus, using the age-based checksum technique described above, checksums 1240 and 1270 (e.g., "CHECKSUM 1") may be calculated for documents 1220 and 1250, respectively. Checksums 1240 and 1270 may match (e.g., indicating that documents 1220 and 1250 are duplicates) since both documents 1220 and 1250 may include common content 1230, and the age-based checksum technique may exclude new content 1260 from the calculation of checksum 1270. This may enable document 1220 and re-crawled document 1250 to remain as duplicates for an extended period of time.

When new content 1260 becomes old enough to be considered in the calculation of the age-based checksum described above, the checksums associated with document 1220 and re-crawled document 1250 may be different (i.e., not considered duplicates). However, crawl skew analyzer 430 may address this situation. As shown in FIG. 13, such a situation may be only temporary. As illustrated, document 1220 may eventually be re-crawled (e.g., as shown by re-crawled document 1300) and may include common content 1230 and new content 1260. New content 1260 of re-crawled document 1300 may become old enough to be considered in the calculation of the age-based checksum. Thus, using the age-based checksum technique described above, checksums 1320 (e.g., "CHECKSUM 2") may be calculated for documents 1250 and 1300. Checksums 1320 may match (e.g., indicating that documents 1250 and 1300 are duplicates) since both documents 1250 and 1300 may include common content 1230 and new content 1260, and the age-based checksum technique may include new content 1260 in the calculation of checksums 1320. This may enable re-crawled document 1250 and re-crawled duplicate document 1300 to once again be considered duplicates.

Exemplary Indexing Engine Functional Components

Figure 14:
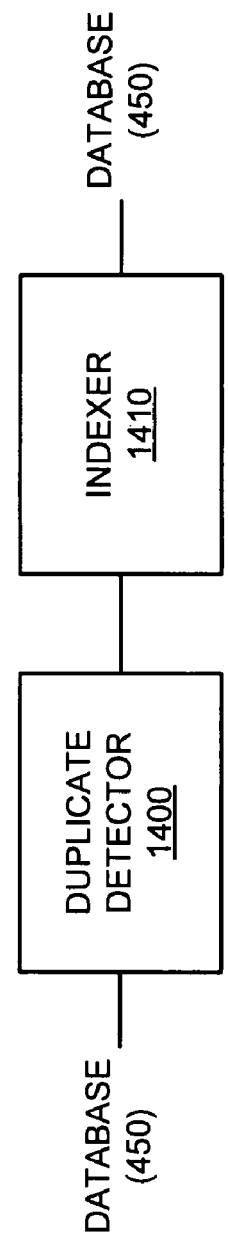
FIG. 14 illustrates a diagram of exemplary functional components of an indexing engine of the crawler/indexer system depicted in FIG. 4.

FIG. 14 is a diagram of exemplary functional components of indexing engine 440. As illustrated, indexing engine 440 may include a duplicate detector 1400 and an indexer 1410. In one implementation, indexing engine 440 may be implemented by software and/or hardware within crawler/indexer system 220. In another implementation, indexing engine 440 may be implemented by software and/or hardware within another device or a group of devices separate from or including crawler/indexer system 220.

Duplicate detector 1400 may place crawled documents into duplicate clusters. Duplicate detector 1400 may use one or more of a number of techniques to determine whether two documents are duplicates (including substantial duplicates) of each other. The techniques may generally fall into the categories of content-based clustering and predictive clustering. Content-based clustering may require an analysis of the contents of the documents to identify duplicates. Predictive clustering may identify duplicate documents without analyzing the contents of the documents.

An example of a content-based clustering technique may involve duplicate detector 1400 computing a checksum or hash over the content, or a portion of the content, of a document. In another example, duplicate detector 1400 may receive checksums (e.g., from database 450) computed by document age analyzer 420 (e.g., by checksum calculator 620). Two documents with the same checksum or hash may be considered duplicates of each other. The age-based checksums provided by document age analyzer 420 may ensure that the two documents remain duplicates even when a portion of one of the documents contains new content.

An example of a predictive clustering technique may involve computing checksums or hashes over a web site, a directory or subdirectory, or a combination of address parameters, and generating a set of rules that given an address, predicts a cluster identifier (ID) for the document associated with that address. A separate set of rules may be generated for each web site, directory, subdirectory, or address parameter combination. Some of these rules may list address prefixes that are equivalents of each other. For example, these rules might specify that www.mysite.com, mysite.com, www-.geocities.com/mysite, and geocities.com/mysite are equivalents of each other. Thus, each of these addresses may map to the same cluster ID. Some other rules may identify address parameters that are irrelevant. For example, these rules might specify that given the address www.forum.com/posts, a post identifier (postid) parameter matters, but a session identifier (sid) parameter does not matter. Thus, these rules might identify the addresses www.forum.com/posts/postid=108/sid=162 and www.forum.com/posts/postid=108/sid=867 as equivalents of each other. Thus, each of these addresses may map to the same cluster ID.

Duplicate detector 1400 may place each crawled document into a cluster. The cluster may have a single document or thousands or millions of documents. Duplicate detector 1400 may rank the documents in a cluster in some manner to create a ranked list. In one implementation, duplicate detector 1400 may use information that reflects a quality of the documents to rank the documents within the ranked list. In one implementation, this information may include a measure of quality, such as the document's link-based score.

Indexer 1410 may index one or more top-ranked documents from each of the ranked lists. For example, indexer 1410 may take the text or other data of a top-ranked document in a ranked list, extract individual terms or other data from the text of the document, and sort those terms or other data (e.g., alphabetically) in an index. Other techniques for extracting and indexing content, that are more complex than simple word-level indexing, may also or alternatively be used, including techniques for indexing XML data, images, videos, etc. Each entry in the index may contain a term or other data stored in association with a list of documents in which the term or other data appears and the location within the document where the term or other data appears.

Although FIG. 14 shows exemplary functional components of indexing engine 440, in other implementations, indexing engine 440 may contain fewer, different, or additional functional components than depicted in FIG. 14. In still other implementations, one or more functional components of indexing engine 440 may perform one or more other tasks described as being performed by one or more other functional components of indexing engine 440.

Exemplary Process for Aging Portions of a Document

FIGS. 15-18 depict flow charts of an exemplary process 1500 for aging portions of a document, according to implementations described herein. In one implementation, exemplary process 1500 may be performed by document age analyzer 420 and/or crawl skew analyzer 430. In another implementation, exemplary process 1500 may be performed by one or more other components, possibly in conjunction with document age analyzer 420 and/or crawl skew analyzer 430.

Figure 15:
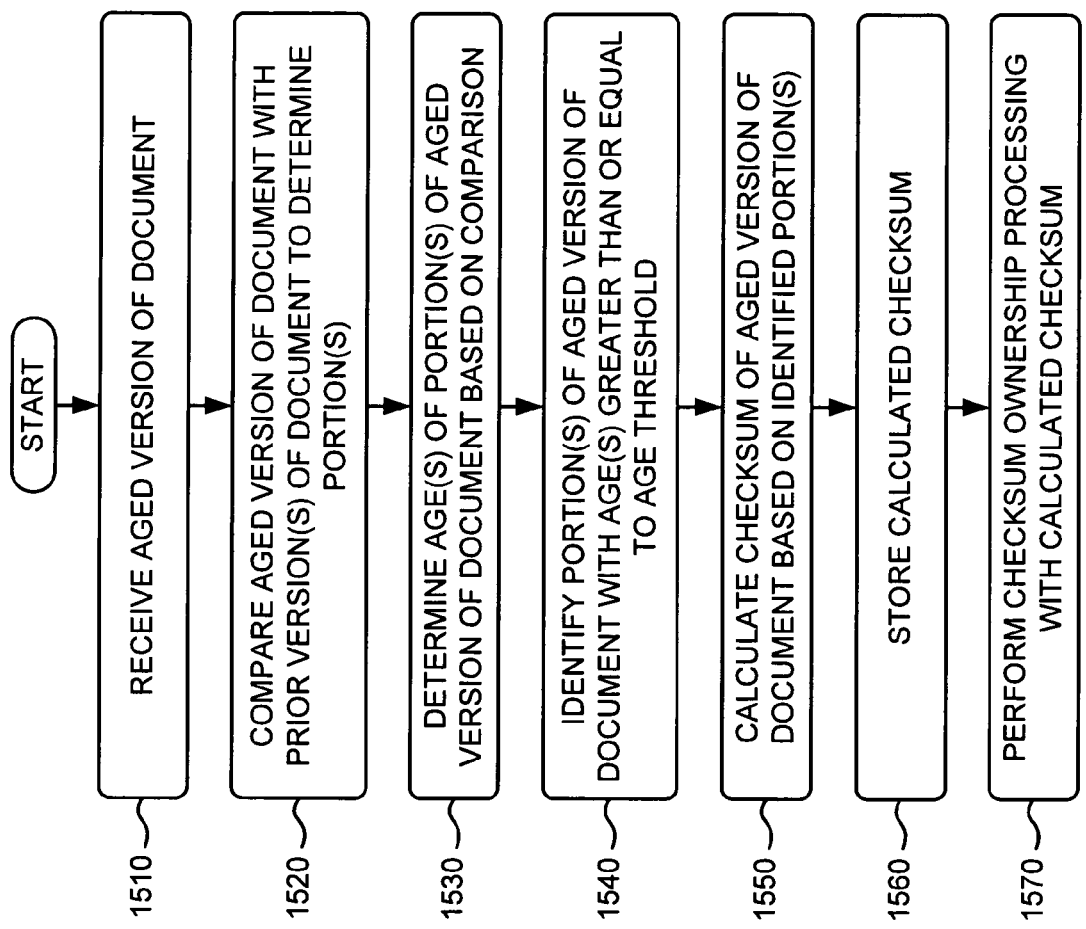

As shown in FIG. 15, process 1500 may begin with receipt of an aged version of a document (block 1510), and a comparison of the aged version of the document with one or more prior versions of the document to determine one or more portions of the aged version of the document that have changed and/or not changed (block 1520). For example, in implementations described above in connection with FIG. 6, content age assigner 600 of document age analyzer 420 may receive an aged version of a document (e.g., a document retrieved from a current crawl), and may compare the aged version of the document with one or more prior versions of the document (e.g., versions of the document retrieved from prior crawls). In one example, the versions of the document may be stored as a sequence of portions or tokens (e.g., words, phrases, one or more characters, etc.). An age field or parameter may be associated with each token, and may indicate an age of the token. Content age assigner 600 may increase the age parameter of the token based on crawl times associated with the versions of the document.

As further shown in FIG. 15, age(s) of one or more portions of the aged version of the document may be determined based on the comparison (block 1530), and one or more portions of the aged version of the document with age(s) greater than or equal to an age threshold may be identified (block 1540). For example, in implementations described above in connection with FIG. 6, content age assigner 600 of document age analyzer 420 may identify aged (e.g., reused or common) and/or new (or changed) content 640 associated with the document. In one example, content age assigner 600 may compare age parameters to an age threshold (e.g., a minimum age threshold), and may determine if a document token (e.g., a portion of the document) is aged (e.g., greater than or equal to the minimum age threshold) and/or is new (e.g., less than the minimum age threshold) based on the age parameters.

Returning to FIG. 15, a checksum of the aged version of the document may be calculated based on the one or more identified portions (block 1550), and the calculated checksum may be stored (block 1560). For example, in implementations described above in connection with FIG. 6, aged content identifier 610 of document age analyzer 420 may receive aged/new content 640 from content age assigner 600, and may remove new (or changed) content 650 from aged/new content 640. Aged content identifier 610 may remove aged content 660 from aged/new content 640, and may provide aged content 660 to checksum calculator 620. Checksum calculator 620 may receive aged content 660 from aged content identifier 610, and may calculate checksum 670 of aged content 660. In one example, aged content 660 may include one or more portions of the document with age(s) greater than or equal to the minimum age threshold. Thus, checksum calculator 620 may calculate a checksum of the document based on the identified one or more portions of the document with age(s) greater than or equal to the minimum age threshold. Checksum calculator 620 may provide checksum 670 to database 450.

As further shown in FIG. 15, checksum ownership processing may be performed with the calculated checksum (block 1570). For example, in implementations described above in connection with FIG. 7, crawl skew analyzer 430 may address the problem of crawl skew by implementing a checksum ownership process. For example, assume that a prior version of a document (e.g., a blog page) and its duplicate contain aged content, that an aged (e.g., re-crawled) version of the document contains the aged content and new content (e.g., a new blog posting), and that the duplicate does not contain the new content. When the new content becomes old enough to be considered in the age-based checksum described above (e.g., checksum 670), the checksums associated with the aged version of the document and the duplicate may be different. Thus, the aged version of document and its duplicate may not be considered duplicates. The checksum ownership process may address such crawl skew by enabling the aged version of the document and the duplicate to remain as duplicates for an extended period of time.

Process block 1520 may include the process blocks depicted in FIG. 16. As shown in FIG. 16, process block 1520 may include determining the one or more portions of the aged version of the document that match one or more portions of the prior version(s) of the document based on a longest common subsequence procedure (block 1600) or based on a winnowing procedure (block 1610). For example, in implementations described above in connection with FIG. 6, content age assigner 600 of document age analyzer 420 may identify aged/new content 640 using a longest common subsequence (LCS) process or a winnowing process. The longest common subsequence process may include determining a longest subsequence common to sequences in a set of sequences. In one example, content age assigner 600 may identify aged content as a longest subsequence (e.g., portions of a document) common to both the aged and prior versions of the document. The LCS process may include an algorithm that compares an aged document with a small number of previous documents. Content age assigner 600 may utilize the winnowing process (e.g., as set forth in Schleimer et al., "Winnowing: Local Algorithms for Document Fingerprinting," Proceedings Of The 2003 ACM SIGMOD International Conference On Management Of Data (June 2003)) to determine a set of fingerprints for each version of the document, to identify aged content based on an intersection of the sets of fingerprints, and to identify new content based on content from the new document falling outside of the intersection of the sets of fingerprints. The winnowing process may include an approximate approach that efficiently compares re-crawled documents with a larger number of previous versions of the document.

Process block 1530 may include the process blocks depicted in FIG. 17. As shown in FIG. 17, process block 1530 may include analyzing age parameter(s) of token(s) associated with the portion(s) of the aged version of the document (block 1700), and increasing the age parameter(s) based on crawl times associated with the aged and prior versions of the document (block 1710). For example, in implementations described above in connection with FIG. 6, the versions of the document may be stored as a sequence of portions or tokens (e.g., words, phrases, one or more characters, etc.). An age field or parameter may be associated with each token, and may indicate an age of the token. Content age assigner 600 may determine the age parameter of the token by comparing crawl times associated with the versions of the document. In one example, content age assigner 600 may set a token's age parameter based on a difference between crawl times of a document associated with the token (e.g., using a counting function). For example, if it is currently 6:00 AM and a prior version of a document was crawled at 1:00 AM, content age assigner 600 may set a token's age parameter to a value (e.g., five). If an aged version of the document was crawled at 2:00 AM, content age assigner 600 may set the same token's age parameter to another value (e.g., four).

Process block 1570 may include the process blocks depicted in FIG. 18. As shown in FIG. 18, process block 1570 may including determining whether the calculated checksum matches a checksum associated with a cluster of duplicates (block 1800). For example, in implementations described above in connection with FIGS. 7 and 8A, checksum comparer 720 of crawl skew analyzer 430 may receive associated checksums/cluster IDs 750 from checksum/cluster ID associator 700, may receive associated cluster IDs/URLs 770 from cluster ID/URL associator 710, and may receive checksums 740 and/or URLs 760. Checksum comparer 720 may determine if calculated checksums (e.g., checksums 740) match checksums associated with a cluster ID (e.g., matches checksums provided in associated checksum/cluster ID 750). Checksum comparer 720 may compare calculated checksums (e.g., checksums 740) with checksums provided in associated checksums/cluster IDs 750 (e.g., with checksums provided in table portion 800 (FIG. 8A)).

As further shown in FIG. 18, if the checksums match (block 1810—YES), the calculated checksum may be verified with the matching cluster of duplicates (block 1820), and the cluster of duplicates and an address associated with the aged version of the document may be merged with another cluster based on a presence of an address in one of the clusters that assumes a checksum owned by the other cluster (block 1830). For example, in implementations described above in connection with FIG. 7, if the calculated checksums match one of the checksums provided in associated checksums/cluster IDs 750, checksum comparer 720 may provide matching checksums 780 to checksum/cluster ID associator 700 and cluster ID/URL associator 710. Checksum/cluster ID associator 700 may receive matching checksums 780, and may verify matching checksums 780 with corresponding cluster IDs. Cluster ID/URL associator 710 may receive matching checksums 780, and may add URLs associated with checksums 780 to the corresponding cluster IDs.

Returning to FIG. 18, if the checksums do not match (block 1810—NO), a new cluster of duplicates may be created (block 1840), the calculated checksum may be associated with the new cluster of duplicates (block 1850), and an address associated with the aged version of the document may be added the new cluster of duplicates (block 1860). For example, in implementations described above in connection with FIG. 7, if the calculated checksums do not match one of the checksums provided in associated checksums/cluster IDs 750, checksum comparer 720 may provide non-matching checksums 790 to checksum/cluster ID associator 700 and cluster ID/URL associator 710. Checksum/cluster ID associator 700 may receive non-matching checksums 790, and may associate non-matching checksums 790 with corresponding new cluster IDs. Cluster ID/URL associator 710 may receive non-matching checksums 790, and may add URLs associated with non-matching checksums 790 to the corresponding new cluster IDs.

As further shown in FIG. 18, a representative may be selected for the matching and/or new cluster of duplicates (block 1870), and the representative may be indexed (block 1880). For example, in implementations described above in connection with FIG. 14, duplicate detector 1400 may place each crawled document into a cluster, and may rank the documents in a cluster in some manner to create a ranked list. Indexer 1410 may index one or more top-ranked documents from each of the ranked lists. In one example, indexer 1410 may take the text or other data of a top-ranked document in a ranked list, extract individual terms or other data from the text of the document, and sort those terms or other data (e.g., alphabetically) in an index. Other techniques for extracting and indexing content, that are more complex than simple word-level indexing, may also or alternatively be used, including techniques for indexing XML data, images, videos, etc. Each entry in the index may contain a term or other data stored in association with a list of documents in which the term or other data appears and the location within the document where the term or other data appears.

CONCLUSION

Implementations described herein may age one or more portions of documents so that documents with high frequency content changes and/or documents that experience crawl skew may be kept in the same duplicate clusters as documents having the same and/or similar content.

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 15-18, the order of the blocks may be modified in other implementations. Further, non-dependent blocks may be performed in parallel.

As used herein, the term "component," is intended to be broadly interpreted to refer to hardware, software, or a combination of hardware and software.

Systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving a document;
   comparing the document with a prior version of the document;
   determining, based on the comparison, at least one first portion of the document that is common with the prior version of the document and at least one second portion of the document that is uncommon with the prior version of the document;
   determining an age of the at least one first portion and the at least one second portion;
   determining whether the age of the at least one first portion is greater than or equal to an age threshold and that the age of the at least one second portion is less than the age threshold;
   calculating a checksum of the document based on the at least one first portion but not the at least one second portion when the age of the at least one first portion is greater than or equal to the age threshold and the age of the at least one second portion is less than the age threshold; and
   storing the calculated checksum.

2. The method of claim 1, where comparing the document with a prior version of the document comprises one of:
   comparing the document with the prior version of the document using a longest common subsequence process; or
   comparing the document with the prior version of the document using a winnowing process.

3. The method of claim 1, where determining the age of the at least one first portion and the at least one second portion comprises:
   analyzing an age parameter of a token associated with the at least one first portion;
   analyzing an age parameter of a token associated with the at least on second portion;
   increasing the age parameters each time the document is crawled; and
   determining the age of the least one first portion and the at least one second portion based on the increased age parameters.

4. The method of claim 1, further comprising:
determining whether the calculated checksum matches a checksum associated with a cluster of duplicate documents; and
associating the document with the cluster of duplicate documents when the calculated checksum matches the checksum associated with the cluster of duplicate documents.

5. The method of claim 4, further comprising:
selecting one of the documents in the cluster of duplicate documents as representative of the cluster of duplicate documents; and
indexing the selected document.

6. The method of claim 5, where selecting one of the documents in the cluster of duplicate documents as representative of the cluster of duplicate documents comprises:
creating a ranked list of the documents in the cluster of duplicate documents.

7. The method of claim 4, where, when the calculated checksum does not match the checksum associated with the cluster of duplicate documents, the method further comprises:
creating a new cluster of duplicate documents; and
associating the document with the new cluster of duplicate documents.

8. The method of claim 1, where the at least one second portion comprises changing content.

9. The method of claim 1, where the at least one second portion comprises new content.

10. A computing device-implemented system, comprising:
means for receiving an aged version of a document;
means for comparing the aged version of the document with a prior version of the document;
means for determining at least one first portion of the aged version of the document that is common with the prior version of the document based on the comparison;
means for determining at least one second portion of the aged version of the document that is uncommon with the prior version of the document based on the comparison;
means for determining an age of the at least one first portion and the at least one second portion;
means for determining whether the age of the at least one first portion is greater than or equal to an age threshold and that the age of the at least one second portion is less than the age threshold;
means for calculating a checksum of the aged version of the document based on the at least one first portion but not the at least one second portion when the age of the at least one first portion is greater than or equal to the age threshold and the age of the at least one second portion is less than the age threshold;
means for determining whether the calculated checksum matches a checksum associated with a cluster of duplicate documents; and
means for associating the aged version of the document with the cluster of duplicate documents when the calculated checksum matches the checksum associated with the cluster of duplicate documents.

11. The system of claim 10, further comprising:
means for creating a new cluster of duplicate documents when the calculated checksum does not match the checksum associated with the cluster of duplicate documents; and
means for associating the aged version of the document with the new cluster of duplicate documents when the calculated checksum does not match the checksum associated with the cluster of duplicate documents.

12. A system, comprising:
a memory to store a plurality of instructions; and
a processor to execute instructions in the memory to:
receive a document,
compare the document with a prior version of the document,
determine, based on the comparison, at least one first portion of the document that is common with the prior version of the document, and at least one second portion of the document that is uncommon with the prior version of the document,
determine an age of the at least one first portion and the at least one second portion,
determine whether the age of the at least one first portion is greater than or equal to an age threshold and that the age of the at least one second portion is less than the age threshold,
calculate a checksum of the document based on the at least one first portion but not the at least one second portion when the age of the at least one first portion is greater than or equal to the age threshold and the age of the at least one second portion is less than the age threshold, and
associate the document with a cluster of duplicate documents when the calculated checksum matches the checksum associated with the cluster of duplicate documents.

13. The system of claim 12, where, when determining the age of the at least one first portion and the at least one second portion, the processor is configured to:
analyze an age parameter of a token associated with the at least one first portion,
analyze an age parameter of a token associated with the at least on second portion,
increase the age parameters each time the document is crawled, and
determine the age of the least one first portion and the at least one second portion based on the increased age parameters.

14. The system of claim 12, where the processor is further configured to:
create a new cluster of duplicate documents when the calculated checksum does not match the checksum associated with the cluster of duplicate documents, and
associate the document with the new cluster of duplicate documents when the calculated checksum does not match the checksum associated with the cluster of duplicate documents.

15. The system of claim 14, where the at least one second portion comprises one of changing content or new content.

16. The system of claim 12, where the processor is further configured to:
select one of the documents in the cluster of duplicate documents as representative of the cluster of duplicate documents, and
index the selected document.

17. The system of claim 12, where the document includes new content and aged content, and when determining the at least one first portion and the at least one second portion, the processor is configured to:
determine whether the at least one first portion comprises the aged content of the document, and
calculate the checksum of the document based solely on the aged content of the document.

18. The system of claim 12, where:
the document comprises a currently-crawled version of the document, and the prior version of the document comprises a previously-crawled version of the document.

19. A computing device-implemented method, comprising:
receiving a document that includes new content and aged content;
comparing the document with a prior version of the document that includes the aged content but not the new content;
separating the new content and the aged content based on the comparison;
determining ages associated with the new content and the aged content;
determining whether the ages of the new content and the aged content are greater than or equal to an age threshold;
calculating a checksum of the document based on the aged content but not the new content when the age of the aged content is greater than or equal to the age threshold, and the age of the new content is less than the age threshold; and
storing the calculated checksum.

20. The method of claim 19, where determining ages associated with the new content and the aged content comprises:
analyzing age parameters associated with the new content and the aged content;
increasing the age parameters each time the document is crawled; and
determining the ages of the new content and the aged content based on the increased age parameters.

21. The method of claim 19, further comprising:
determining whether the calculated checksum matches a checksum associated with a cluster of duplicate documents; and
associating the document with the cluster of duplicate documents when the calculated checksum matches the checksum associated with the cluster of duplicate documents.

22. The method of claim 21, further comprising:
selecting one of the documents in the cluster of duplicate documents as representative of the cluster of duplicate documents; and
indexing the selected document.

23. The method of claim 21, where, when the calculated checksum does not match the checksum associated with the cluster of duplicate documents, the method further comprises:
creating a new cluster of duplicate documents; and
associating the document with the new cluster of duplicate documents.

24. One or more devices, comprising:
a memory to store a plurality of instructions; and
a processor to execute instructions in the memory to:
receive a document that includes new content and aged content,
compare the document with a prior version of the document,
determine, based on the comparison, the new content that is not in the prior version of the document and the aged content that is in the prior version of the document,
determine ages associated with the new content and the aged content,
determine whether the ages of the new content and the aged content are greater than or equal to an age threshold,
index the new content when the age of the new content is determined to be less than the age threshold,
determine, when the age of aged content is determined to be greater than or equal to the age threshold, whether the aged content is associated with a cluster of duplicate documents, and
associate the document with the cluster of duplicate documents when the aged content is associated with the cluster of duplicate documents.

25. A computing device-implemented method, comprising:
receiving, via the computing device, a document that includes new content and aged content;
comparing, via a processor associated with the computing device, the document with a prior version of the document;
determining, via the processor and based on the comparison, the new content that is not in the prior version of the document and the aged content that is in the prior version of the document;
determining, via the processor, ages associated with the new content and the aged content;
determining, via the processor, whether the ages of the new content and the aged content are greater than or equal to an age threshold;
indexing, via the processor, the new content when the age of the new content is determined to be less than the age threshold;
storing the indexed new content in a memory associated with the computing device;
determining, via the processor and when the age of aged content is determined to be greater than or equal to the age threshold, whether the aged content is associated with a cluster of duplicate documents, and
associating, via the processor, the document with the cluster of duplicate documents when the aged content is associated with the cluster of duplicate documents.

* * * * *